US012175840B2

(12) United States Patent
Shigeta

(10) Patent No.: US 12,175,840 B2
(45) **Date of Patent: *Dec. 24, 2024**

(54) TABLE GAME SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,990

(22) Filed: May 25, 2023

(65) Prior Publication Data

US 2023/0298438 A1 Sep. 21, 2023

Related U.S. Application Data

(63) Continuation of application No. 17/408,827, filed on Aug. 23, 2021, now Pat. No. 11,710,380, which is a (Continued)

(51) Int. Cl.

| | |
|---|---|
| ***A63F 9/24*** | (2006.01) |
| ***A63F 1/10*** | (2006.01) |
| ***A63F 1/14*** | (2006.01) |
| ***A63F 1/18*** | (2006.01) |
| ***G07F 17/32*** | (2006.01) |

(52) U.S. Cl.

CPC ............ *G07F 17/3269* (2013.01); *A63F 1/10* (2013.01); *A63F 1/14* (2013.01); *A63F 1/18* (2013.01); *G07F 17/322* (2013.01); *G07F 17/3234* (2013.01); *G07F 17/3241* (2013.01); *G07F 17/3244* (2013.01); *G07F 17/3276* (2013.01);

(Continued)

(58) Field of Classification Search

CPC . A63F 1/06; A63F 1/18; G07F 17/322; G07F 17/3234; G07F 17/3269

See application file for complete search history.

(56) References Cited

U.S. PATENT DOCUMENTS

| | | | |
|---|---|---|---|
| 8,920,229 | B1 | 12/2014 | Chun |
| 2002/0068635 | A1 | 6/2002 | Hill |

(Continued)

FOREIGN PATENT DOCUMENTS

| | | | |
|---|---|---|---|
| CN | 102186542 | A | 9/2011 |
| CN | 102805931 | A | 12/2012 |

(Continued)

OTHER PUBLICATIONS

Korean Office Action dated Apr. 25, 2019 issued for KR Application 10-019-7007744.

(Continued)

*Primary Examiner* — Lawrence S Galka

(74) *Attorney, Agent, or Firm* — NORTON ROSE FULBRIGHT US LLP

(57) ABSTRACT

In a table game system provided by the present invention, a card shoe used in a table game can be used to calculate periods associated with the progress of the game handled by a dealer, particularly periods from the time when a card is drawn from a card accommodating section to the time when a result of the game is displayed, such as a game play period, and other periods excluding the play period which includes a bet period and a bet settlement period.

13 Claims, 13 Drawing Sheets

Related U.S. Application Data continuation of application No. 16/440,423, filed on Jun. 13, 2019, now Pat. No. 11,132,869, which is a continuation of application No. 15/535,238, filed as application No. PCT/JP2014/084744 on Dec. 12, 2014, now Pat. No. 10,366,576.

(52) U.S. Cl.
CPC ...... *G07F 17/3288* (2013.01); *G07F 17/3293* (2013.01)

(56) References Cited

U.S. PATENT DOCUMENTS

| | | | |
|---|---|---|---|
| 2008/0180250 | A1 | 7/2008 | Steil |
| 2009/0191933 | A1* | 7/2009 | French ...................... A63F 1/18 463/46 |
| 2010/0038849 | A1 | 2/2010 | Scheper et al. |
| 2010/0273547 | A1* | 10/2010 | Stasi ................... G07F 17/3269 463/16 |
| 2011/0127722 | A1 | 6/2011 | Emori et al. |
| 2011/0227283 | A1 | 9/2011 | Schbert et al. |
| 2012/0306152 | A1 | 12/2012 | Krishnamurty et al. |
| 2013/0109455 | A1 | 5/2013 | Grauzer et al. |
| 2013/0277911 | A1 | 10/2013 | Shigeta |
| 2013/0292902 | A1 | 11/2013 | Shigeta |
| 2013/0303277 | A1 | 11/2013 | Shigeta |
| 2014/0309006 | A1 | 10/2014 | Shigeta |
| 2014/0353913 | A1 | 12/2014 | Shigeta |
| 2015/0190707 | A1 | 7/2015 | Shigeta |
| 2015/0238849 | A1 | 8/2015 | Shigeta |
| 2015/0258420 | A1 | 9/2015 | Shigeta |
| 2016/0196718 | A1 | 7/2016 | Grauzer et al. |

FOREIGN PATENT DOCUMENTS

| | | | |
|---|---|---|---|
| CN | 103657086 | A | 3/2014 |
| CN | 103706112 | A | 4/2014 |
| CN | 103768786 | A | 5/2014 |
| JP | 2005046621 | A | 2/2005 |
| JP | 2009-066172 | | 4/2009 |
| JP | 2011115266 | A | 6/2011 |
| JP | 2013132551 | A | 7/2013 |
| JP | 2014064867 | A | 4/2014 |
| JP | 2014083414 | A | 5/2014 |
| WO | 2012035742 | A1 | 3/2012 |
| WO | 2014-064872 | | 5/2014 |
| WO | 2014-118497 | A1 | 8/2014 |

OTHER PUBLICATIONS

Canadian Office Action dated May 25, 2018 issued for CA Application 2970219.

New Zealand First Examination Report dated Nov. 15, 2017 issued for NZ Application 732645.

International Search Report for PCT/JP2014/084744 mailed Jun. 2, 2015.

Chinese Office Action dated Nov. 28, 2019 issued for CN Application 201480083986.1.

Japanese Office Action dated Jun. 30, 2020 issued for JP Application 2019-110095.

Japanese Office Action dated Apr. 6, 2021 issued for JP Application 2019-110095.

Japanese Office Action dated Jun. 14, 2022 issued for JP Application 2021-121964.

Singaporean Office Action dated Sep. 6, 2022 issued for SG Application 10201901378S.

Chinese Office Action dated Nov. 11, 2023 issued for CN Application 202011000814.7.

Chinese Office Action dated Nov. 11, 2023 issued for CN Application 202011002619.8.

1 Singaporean Office Action dated Apr. 12, 2024 issued for SG Application 10201914114W.

* cited by examiner

TABLE GAME SYSTEM

CROSS-REFERENCE TO RELATED APPLICATIONS

This application is a continuation of U.S. patent application Ser. No. 17/408,827 filed Aug. 23, 2021, which is a continuation of U.S. patent application Ser. No. 16/440,423 filed Jun. 13, 2019 (now U.S. Pat. No. 11,132,869), which is a continuation from U.S. patent application Ser. No. 15/535,238 filed Jun. 12, 2017 (now U.S. Pat. No. 10,366,576), which is a national phase application under 35 U.S.C. § 371 of International Pat. App. No. PCT/JP2014/084744 filed Dec. 12, 2014, the entire contents of each disclosure is specifically incorporated by reference herein without disclaimer.

BACKGROUND

1. Technical Field

The present invention relates to a system that allows grasp of progress of a card game, particularly, baccarat, and particularly to a table game system having the function of analyzing a variety of periods on a single game basis or over a plurality of games.

2. Background Art

Baccarat is a table game played in a casino and other places. In baccarat, in which a standard deck formed of 52 playing cards is typically used, a plurality of decks (6 to 9 or 10 decks) of playing cards are randomly shuffled in advance and accommodated in a card shoe, the playing cards are drawn one by one from the card shoe onto a table, and the game progresses on the basis of the rank (number) of the drawn card. Two or three of the cards are dealt to each of the player and the banker on the basis the rules of baccarat, and the player or the banker who has the sum of the ranks (numbers) of the dealt cards that is closer to 9 wins. A bet is placed on whether the player wins, the banker wins, or they tie. Handling bet placement, drawing cards from the card shoe, and bet settlement after win/loss is determined (payment to winning punter (player) and collection of bets from losing punter (player) are done, for example), by a dealer who is responsible for the game table.

For example, in each game table, how many games can be played per day greatly affects the profit of the day earned by the casino. It is therefore required to develop a technology for measuring how many games per unit period are played on a table basis or a dealer basis or how long it takes to play one game on a detailed step basis in each game. A technology for measuring periods in a table game, such as baccarat, is disclosed, for example, in WO 2014/064872 (Patent Literature 1).

International Publication No. WO 2014/064872 describes that the table game system senses that a cut-card is drawn from a card shoe in a table game, stops using the cards accommodated in the card shoe, and times the timing at which the current cards are exchanged by a new set or package of cards. The table game system, however, cannot measure details of the dealer's ability of handling progress of a game.

SUMMARY OF INVENTION

The present invention has been made under the background described above and provides a system that uses a card shoe used in a table game to measure, as periods in the course of a game handled by a dealer, particularly, a game play period from the time when a card is drawn from a card accommodating section to the time when a result of the game is displayed, and periods other than the play period including periods spent for bet placement and bet settlement.

Further, in addition to the measurement of the detailed periods in a single game, measurement of the detailed periods over a plurality of games allows grasp of the sum and average of the detailed periods and dispersion and progress tendencies thereof, whereby countermeasures can be examined.

Another object of the present invention is to provide a system that measures a period required to stop using cards accommodated in the card shoe and replace the cards with a new set or package of cards.

To solve the problem of related art described above, the present invention provides a table game system comprising: shuffle playing cards that are playing cards formed of a multiple drawn one by one from the card accommodating section onto a game table; and a management control section that measures, based on points of time when specific items in a card game occur, a period between points of time when at least two of the specific items occur, wherein the card shoe includes a card sensor that senses that one of the cards is drawn and outputs a signal, a card reading section that reads at least a rank of the drawn card, a win/loss evaluating section that performs win/loss evaluation of the card game based on information on the rank of the card read by the card reading section, a win/loss evaluation result output section that outputs a result of the win/loss evaluation performed by the win/loss evaluating section, and a result output start control section that controls start of the win/loss evaluation result output performed by the win/loss evaluation result output section for an instruction to start of the output, the management control section is configured to be capable of receiving, from the card sensor, a signal representing that a card has been drawn and sensed and further measuring how many cards have been drawn in each game, and capable of receiving a signal from the result output start control section and memorizing time when the win/loss evaluation result output starts, and as an item of the measurement of the period between the points of time when the at least two specific items occur, a period from time when a first card is drawn to time when the win/loss evaluation result output starts is measured as a play period.

To solve the problem of related art described above, the present invention provides a table game system comprising: shuffle playing cards that are playing cards formed of a multiple number of decks and shuffled and packaged or set; a card shoe including a card accommodating section that accommodates the shuffle playing cards, and an opening through which the cards are drawn one by one from the card accommodating section onto a game table; and a management control section that measures, based on points of time when specific items in a card game occur, a period between points of time when at least two of the specific items occur, wherein the card shoe includes a card sensor that senses that one of the cards is drawn and outputs a signal, a card reading section that reads at least a rank of the drawn card, a win/loss evaluating section that performs win/loss evaluation of the card game based on information on the rank of the card read by the card reading section, a win/loss evaluation result output section that outputs a result of the win/loss evaluation performed by the win/loss evaluating section, and a result output start control section that controls start of the win/loss evaluation result output performed by the win/loss evaluation result output section for an instruction to start of the output, the management control section is configured to be capable of receiving, from the card sensor, a signal representing that a card has been drawn and sensed and further measuring how many cards have been drawn in each game, and capable of receiving a signal from the result output start control section and memorizing time when the win/loss evaluation result output starts, the table game system further comprises a package exchange detecting section that detects start and end of in-shoe package exchange operation of exchanging the playing cards accommodated in the card accommodating section, and an item of the measurement of the period between the points of time when the at least two specific items occur includes measurement of a period for which shuffle playing cards on a package basis or a set basis are used the period starting at a point of time when a signal representing the end of the in-shoe package exchange operation is received from the package exchange detecting section or a point of time when the card shoe is powered on, and the period ending at a point of time when a signal representing the start of the in-shoe package exchange operation is received from the package exchange detecting section or a point of time when the card shoe is powered off, and measurement of an in-shoe package exchange period with the in-shoe package exchange operation starting at the point of time when the signal representing the start of the in-shoe package exchange operation is received from the package exchange detecting section or the point of time when the card shoe is powered off, and the in-shoe package exchange operation ending at the point of time when the signal representing the end of the in-shoe package exchange operation is received from the package exchange detecting section or the point of time when the card shoe is powered on.

To solve the problem of related art described above, the present invention provides a table game system comprising: shuffle playing cards that are playing cards formed of a multiple drawn one by one from the card accommodating section onto a game table; and a management control section that measures, based on points of time when specific items in a card game occur, a period between points of time when at least two of the specific items occur, wherein the card shoe includes a card sensor that senses that one of the cards is drawn and outputs a signal, a card reading section that reads at least a rank of the drawn card, a win/loss evaluating section that performs win/loss evaluation of the card game based on information on the rank of the card read by the card reading section, a win/loss evaluation result output section that outputs a result of the win/loss evaluation performed by the win/loss evaluating section, and a result output start control section that controls start of the win/loss evaluation result output performed by the win/loss evaluation result output section for an instruction to start of the output, the management control section is configured to be capable of receiving, from the card sensor, a signal representing that a card has been drawn and sensed and further measuring how many cards have been drawn in each game, and capable of receiving a signal from the result output start control section and memorizing time when the win/loss evaluation result output starts, the table game system further comprises a package exchange detecting section that detects start and end of in-shoe package exchange operation of exchanging the playing cards accommodated in the card accommodating section, and an item of the measurement of the period between the points of time when the at least two specific items occur includes measurement of a period for which shuffle playing cards on a package basis or a set basis are used, the period starting at a point of time when a signal representing the end of the in-shoe package exchange operation is received from the package exchange detecting section or a point of time when the card shoe is powered on, and the period ending at a point of time when a signal representing the start of the in-shoe package exchange operation is received from the package exchange detecting section or a point of time when the card shoe is powered off.

To solve the problem of related art described above, the present invention provides a table game system comprising: shuffle playing cards that are playing cards formed of a multiple drawn one by one from the card accommodating section onto a game table; and a management control section that measures, based on points of time when specific items in a card game occur, a period between points of time when at least two of the specific items occur, wherein the card shoe includes a card sensor that senses that one of the cards is drawn and outputs a signal, a card reading section that reads at least a rank of the drawn card, a win/loss evaluating section that performs win/loss evaluation of the card game based on information on the rank of the card read by the card reading section, a win/loss evaluation result output section that outputs a result of the win/loss evaluation performed by the win/loss evaluating section, and a result output stop control section that controls stop of the win/loss evaluation result output performed by the win/loss evaluation result output section for an instruction to stop of the output, the management control section is configured to be capable of receiving a signal from the result output stop control section and memorizing time when the win/loss evaluation result output stops, the table game system further comprises a package exchange detecting section that detects start and end of in-shoe package exchange operation of exchanging the playing cards accommodated in the card accommodating section, and an item of the measurement of the period between the points of time when the at least two specific items occur includes [1] measurement of a period for which shuffle playing cards on a package basis or a set basis are used, the period starting at a point of time when a signal representing the end of the in-shoe package exchange operation is received from the package exchange detecting section or a point of time when the card shoe is powered on, and the period ending at a point of time when a signal representing the start of the in-shoe package exchange operation is received from the package exchange detecting section or a point of time when the card shoe is powered off, [2] measurement of an in-shoe package exchange period, the period starting at the point of time when the signal representing the start of the in-shoe package exchange operation is received from the package exchange detecting section or the point of time when the card shoe is powered off, and the period ending at the point of time when the signal representing the end of the in-shoe package exchange operation is received from the package exchange detecting section or the point of time when the card shoe is powered on, [3] measurement of a game period that starts at a point of time when the win/loss evaluation result output in a preceding game stops and ends at a point of time when the win/loss evaluation result output in a current game stops, and [4] calculation of a sum, an average, or dispersion of the game periods in a plurality of games in the period for which the shuffle playing cards on a package basis or a set basis are used.

To solve the problem of related art described above, the present invention provides a card shoe comprising: a card accommodating section that accommodates shuffle playing cards that are playing cards formed of a multiple number of decks and shuffled and packaged or set; and an opening through which the cards are drawn one by one from the card accommodating section onto a game table, wherein the card shoe further includes a management control section that measures, based on points of time when specific items in a card game occur, a period between points of time when at least two of the specific items occur, a card sensor that senses that one of the cards is drawn and outputs a signal, a card reading section that reads at least a rank of the drawn card, a win/loss evaluating section that performs win/loss evaluation of the card game based on information on the rank of the card read by the card reading section, a win/loss evaluation result output section that outputs a result of the win/loss evaluation performed by the win/loss evaluating section, and a result output stop control section that controls stop of the win/loss evaluation result output performed by the win/loss evaluation result output section for an instruction to stop of the output, the management control section is configured to be capable of receiving a signal from the result output stop control section and memorizing time when the win/loss evaluation result output stops, the card shoe further includes a package exchange detecting section that detects start and end of in-shoe package exchange operation of exchanging the playing cards accommodated in the card accommodating section, and an item of the measurement of the period between the points of time when the at least two specific items occur includes measurement of a period for which shuffle playing cards on a package basis or a set basis are used, the period starting at a point of time when a signal representing the end of the in-shoe package exchange operation is received from the package exchange detecting section or a point of time when the card shoe is powered on, and the period ending at a point of time when a signal representing the start of the in-shoe package exchange operation is received from the package exchange detecting section or a point of time when the card shoe is powered off, and measurement of an in-shoe package exchange period, the period starting at the point of time when the signal representing the start of the in-shoe package exchange operation is received from the package exchange detecting section or the point of time when the card shoe is powered off, and the period ending at the point of time when the signal representing the end of the in-shoe package exchange operation is received from the package exchange detecting section or the point of time when the card shoe is powered on.

According to the table game system of the present invention, the card shoe used in a table game can be used to perform detailed analysis of a period particularly from the time when a card is drawn from a card accommodating section to the time when a result of the game is displayed, as periods associated with the progress of the game handled by a dealer, and grasp of the sum and average of the periods and dispersion and progress tendencies thereof, whereby countermeasures can be examined.

DESCRIPTION OF EMBODIMENTS

Before a detailed description of embodiments, an overview of use and management of a package or set of cards in a casino will be described.

Figure 2:
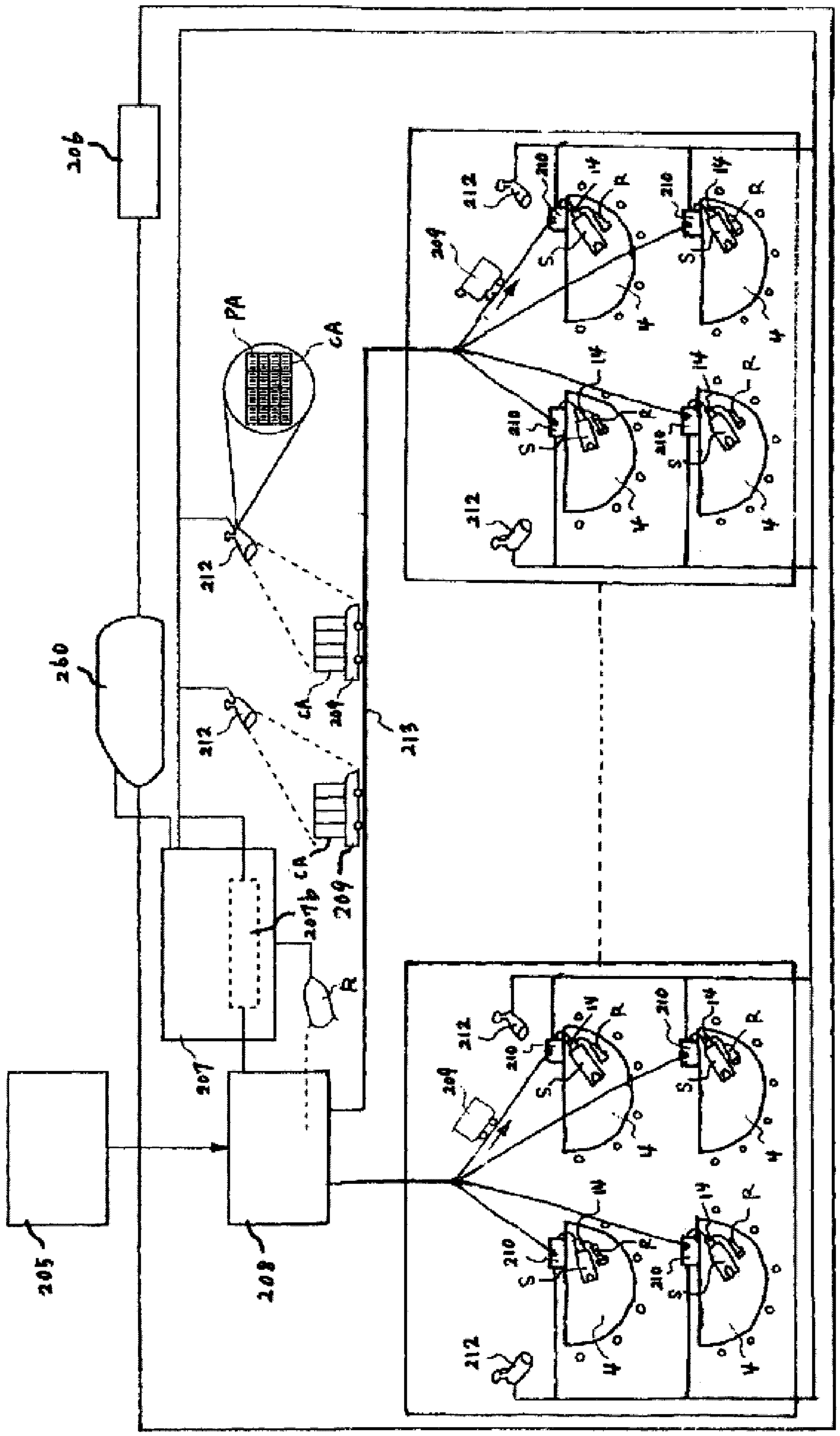
FIG. 2 shows an overview of an entire casino in the embodiment of the present invention.

A package PA of cards 1 used in a casino 206 is given a barcode BC as a unique ID code I, and a plurality of packages PA are supplied to a backyard 208 in the casino 206, as shown in FIG. 2. The ID codes I of all packages PA transported to the backyard 208 are registered in a database 207*b* (such as memory) in a management section 207 (as a registration step of registering all the ID codes I in the database). In this stage, all the ID codes I (barcodes BC (each of which may instead be two-dimensional code, such as QR code)) of the packages PA transported to the backyard 208 are registered to create a basic database. Instead of reading all the barcodes BC of the packages PA supplied to the casino 206, to register all the ID codes I of the packages PA, data from a factory 205 or data on a carton ID code of each carton CA containing packages PA or a palette ID code (not shown) of a palette on which the carton CA is loaded may be used. In implementation of the present invention, to register or read the ID codes I, cameras 212 or RFID tag reading devices (not shown) may be used in place of barcode readers R (not shown). The packages PA may be transported from the factory 205 or any other place in the form of a carton CA that accommodates 18 packages each of which contains shuffle playing cards is (see FIG. 2) (several cartons CA may be placed on the palette). The carton ID code or the palette ID code may be used to register the ID codes I of the packages PA transported from the factory 205 to the backyard 208.

During the period for which the packages PA with the barcodes BC are transported to the casino 206, the packages PA are stored in a carton CA, and the carton CA is placed on a palette and stored in the backyard 208 (see FIG. 2). A unique carton ID code is put on each carton CA, and a unique palette ID is put on each palette. Each carton ID code is registered in advance in the database 207*b* in the management section 207 with the carton ID code related to the ID codes I of the packages contained in the carton CA. Each palette ID code is registered in advance in the database 207*b* in the management section 207 with the palette ID code related to the corresponding carton ID code on the palette and the ID codes of the packages PA stored in the carton CA. The ID code of each package PA is related to the carton ID code of the carton in which the package PA is stored and the palette ID of the palette on which the package PA is stored.

The packages PA are typically remain stored in the cartons CA and transported by a plurality of vehicles 209 from the backyard 208 to cabinets 210 under game tables 4. The packages PA are stored for fixed duration in the cabinets 210 under the game tables 4, and the cards are then taken out in the form of the packages PA manually by dealers D or any other persons from the cabinets 210 under the game tables 4, placed on the game tables 4, and used. All the packages PA present in the casino 206 (or cartons CA that store packages PA) are so monitored that the ID codes I of all the packages each formed of shuffle playing cards (or carton ID codes of cartons CA that store packages PA) are read at predetermined locations by the cameras 212 or the barcode readers R. The monitoring cameras 212 are so installed or equipped as to be capable of reading the barcodes BC (as ID codes I) of all the packages PA in each of which shuffle playing cards are present and which are transported from the backyard 208 and placed in the cabinets 210 under the game tables 4 (or carton ID codes of cartons CA that store packages PA).

In the embodiment, the vehicles 209 transport the packages PA, each of which is formed of shuffle playing cards is to be used in the games, from the backyard 208 to the cabinets 210 under the game tables 4. A plurality of AGVs (automatic guided vehicles) may be used as the vehicles 209. The packages PA are typically transported from the backyard 208 to the cabinets 210 under the game tables 4 with the packages PA stored in the cartons CA, but not necessarily, and the packages PA can instead be simply loaded on the vehicles 209 and transported. A plurality of the packages PA (at least 18 or 36 packages) are stored in the cabinet 210 under each of the game tables 4 and manually transported from the cabinet 210 onto the game table 4. The vehicles 209 transport a plurality of cartons CA or packages PA from the backyard 208 to the cabinet 210 under each of the game tables 4 along a programmed delivery route 213 in the casino 206. In this process, the cameras 212 or other components are used to allow the management section 207 to monitor the vehicles 209 that hold the cartons CA or the packages PA at locations specified in advance on the delivery route 213 in the casino 206. Instead, an ID code reader (another reading device may be used) that reads the carton ID code of the carton CA containing packages PA or the barcodes of the packages PA (as ID codes) at a predetermined timing may be installed in each of the vehicles 209, so that the packages PA or the carton CA loaded in the vehicles 209 can be monitored. Further, the vehicles 209 may each have a structure having transmission means for reading the carton ID code of the carton CA containing packages PA or the barcodes of the packages PA (as ID codes) and transmitting or communicating a result of the reading to an external apparatus at a predetermined timing. A plurality of readers are installed in scan means in each of the vehicles 209, and the scan means moves in the X and Y directions to move the readers in the X and Y directions so that the readers keep reading the carton ID codes of all cartons CA or the barcodes of the packages PA stored in the vehicle 209. A lid of each of the vehicles 209 is provided with a lock, and locking the lid can prevent the cartons CA or the packages PA in the vehicle from being illicitly taken out.

Figure 3:
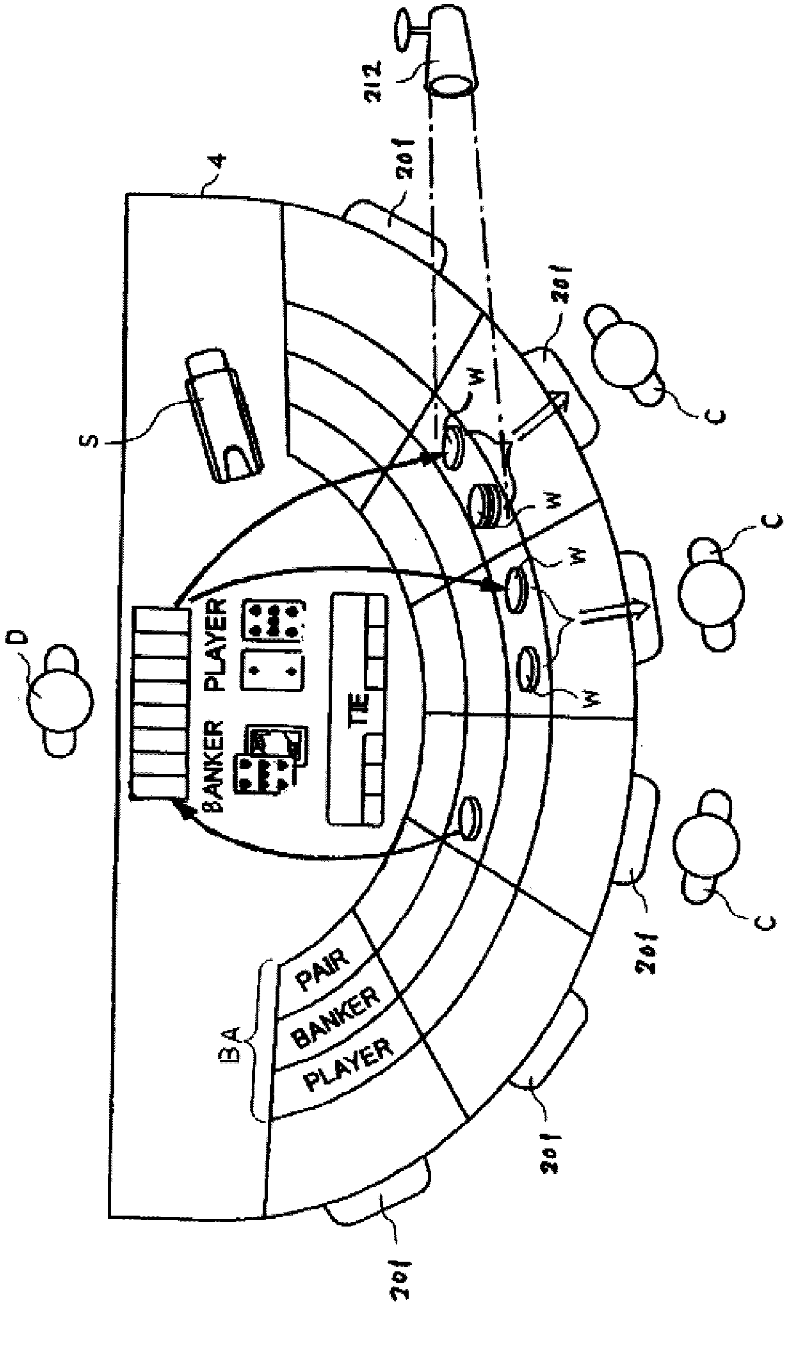
FIG. 3 shows an overview of a game of baccarat on a game table in the embodiment of the present invention.
Figure 4:
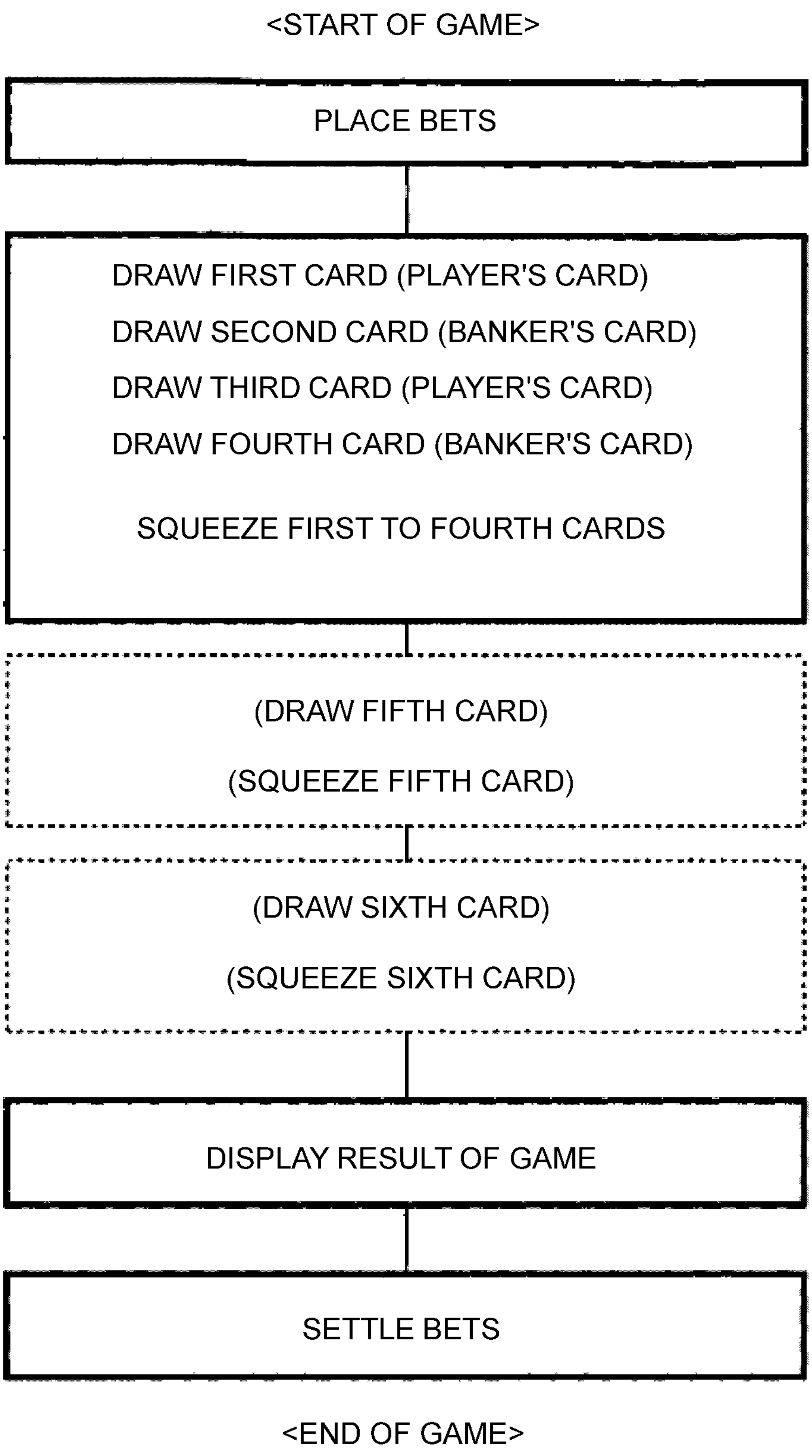
FIG. 4 is a block diagram showing the progress of baccarat in the embodiment of the present invention.

The procedure of baccarat will next be described. On each of the baccarat tables 4, punters (players) C each sit on a seat in such a way that they face a dealer D, as shown in FIG. 3. The punters (players) C place bets a result of win/loss of a game of baccarat, whether the player wins, the banker wins, or they tie, by placing chips W in a bet area BA in front of the punters (players) C (hereinafter referred to as "bet"). The dealer D then times the timing at which the punters (players) C are caused to stop placing bets, declares "no more bet" (stop accepting bet), and moves a hand, for example, laterally. The dealer D then draws cards one by one from a card shoe S onto the game table 4. A first card forms the player's hand, a second card forms the banker's hand, a third card forms the player's hand, and a fourth card forms the banker's hand, as shown in FIG. 4, (drawing first to fourth cards is hereinafter referred to as "dealing").

Since the cards are drawn from the card shoe S with the rear sides of the cards facing upward, the dealer D or the punters (players) C cannot see the rank (number) or the suit (heart, diamond, spade, or club) of each of the cards. After the fourth card is drawn, a punter (player) C who has placed a bet on PLAYER (in a case where a plurality of punters have placed bets on the player, the punter C who has placed the highest bet or in a case where no punter has placed a bet on the player, the dealer D) turns over the first and third cards, the rear sides of which face upward, so that the front sides of the cards face upward, and a punter (player) C who has placed a bet on the banker (in a case where a plurality of punters have placed bets on the banker, the punter C who has placed the highest bet or in a case where no punter has placed a bet on BANKER, the dealer D) turns over the second and fourth cards so that the front sides of the cards face upward (turning over a card the rear side of which faces upward so that the front side of the card faces upward is typically called "squeezing"). On the basis of the ranks (numbers) of the first to fourth cards and the detailed rules of baccarat, the dealer D draws a fifth card and further a sixth card, which form the player's hand and the banker's hand, respectively. Similarly, the punter (player) C who has placed a bet on the player squeezes the card that forms the player's hand, and the punter (player) who has placed a bet on the banker squeezes the card that forms the banker's hand (the period that elapses after the first to fourth cards are drawn and the fifth and sixth cards are squeezed to determine a result of the win/loss is a period for which the punters (players) C enjoy the real thrill. The period is hereinafter referred to as a "player's period").

Further, the win/loss is determined by the time when the first to fourth cards are drawn depending on the ranks (numbers) thereof in some cases, and the win/loss is determined in other cases finally at the time when the fifth and sixth cards are drawn. The dealer D grasps that win/loss has been determined and a result of the win/loss on the basis of the ranks (numbers) of the squeezed cards and, for example, presses a win/loss result display button on the card shoe S to display the result of win/loss on a monitor so that the punters (players) C are notified of the result. At the same time, a win/loss evaluating section 9 of the card shoe S evaluates the result of win/loss of the game. If the result of win/loss is not displayed although the win/loss has been determined and an attempt to further draw a card is made, an error occurs. The card shoe S senses the error and outputs an error signal. Finally, the dealer settles the bet placed by the punter (player), pays a bet to a winning punter (player) C, and collects a bet from a losing punter (player) C during the period for which the win/loss result is displayed. After the bet settlement is completed, the display of the win/loss result is terminated (the period for which the dealer performs bet settlement is hereinafter referred to as a "bet settlement period"), and the punters (players) C start placing bets in the following game.

The procedure of baccarat described above is widely practiced in typical casinos, and the card shoe S described above is an existing card shoe having a structure in which the dealer manually draws cards, configured to read the drawn cards, further having a result display button and a result display section, and having the function of evaluating win/loss and displaying a result of the win/loss evaluation. As described above, on a typical casino floor, the card shoe, the monitor, and other devices are placed on each of a plurality of baccarat tables 4 arranged on the floor, and cards to be used are, on a package or set basis or even on a carton basis, supplied to each of the game tables 4 or the cabinet 210 under each of the tables 4. The thus supplied cards are then used.

Figure 1:
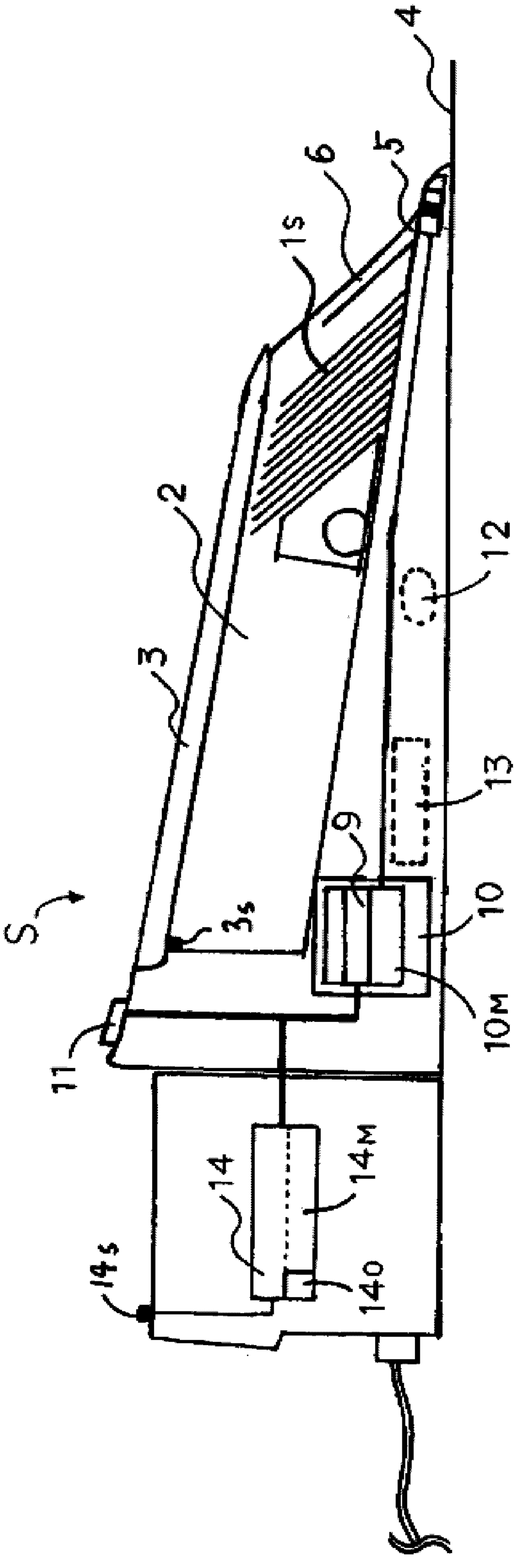
FIG. 1 is a side view of a card shoe and a management control section connected to the card shoe in an embodiment of the present invention.

An embodiment of the card shoe S used in the table game system according to the present invention will be described below with reference to FIG. 1. The card shoe S includes a card accommodating section 2, which accommodates a plurality of shuffle playing cards 1*s*, a lid 3, which is provided in an upper portion of the accommodating section 2, a card guiding section 5, which guides the shuffle playing cards 1 when they are manually drawn by the dealer D or any other person in the casino one by one from the card accommodating section 2 toward the game table 4, an opening 6, through which each of the cards 1 guided by the card guiding section 5 is taken out, a card sensing section (card sensor) 7, which senses that any of the shuffle playing cards 1 has been drawn, a card reading section 8, which reads information representing at least the number (rank) of the shuffle playing card 1 (the card sensing section 7 and the card reading section 8 may each have a structure in which a UV sensor that will be described later is used to read the code of a card, a structure in which a camera or any other device is used to read information printed on a shuffle playing card 1, or the combination thereof), a win/loss evaluating section 9, which evaluates win/loss of the card game on the basis of the numbers (ranks) of shuffle playing cards 1 sequentially read by the card reading section 8, a control section 10, which includes the win/loss evaluating section 9 and a memory 10M, an output section 11, which outputs a result of the evaluation performed by the win/loss evaluating section 9, a result output control section 12, which controls the start and end of the output operation performed by the output section (as the result output control section 12, which controls the start and stop of the result output operation, a result output start control section for starting the result output operation and a result output stop control section for stopping the result output operation may be separately provided, or a single output start/stop control section for starting/stopping the result output operation may be provided. Further, for example, the result output control section 12 may be so provided that part thereof has the shape of a button (win/loss result display button) and is exposed to the outside of the card shoe S. The win/loss result display button may also be formed of separate buttons for starting and stopping the result display operation or a single button for starting/stopping the result display operation. For example, the following configuration may be employed: When the win/loss result display button is pressed once, the control section 10 of the card shoe S senses that the button has been pressed and starts outputting a result of the win/loss evaluation; and when the win/loss result display button is pressed again, the control section 10 similarly senses that the button has been pressed and stops the result output operation), and a side-surface monitor 13, which is provided on the side surface of the card shoe S. Further, the card shoe S is mechanically or electrically connected in a wired or wireless manner to a management control section 14, which has the function of calculating a variety of periods in the course of a game of baccarat on a game basis or over a plurality of games. The variety of periods will be described later.

Figure 5:
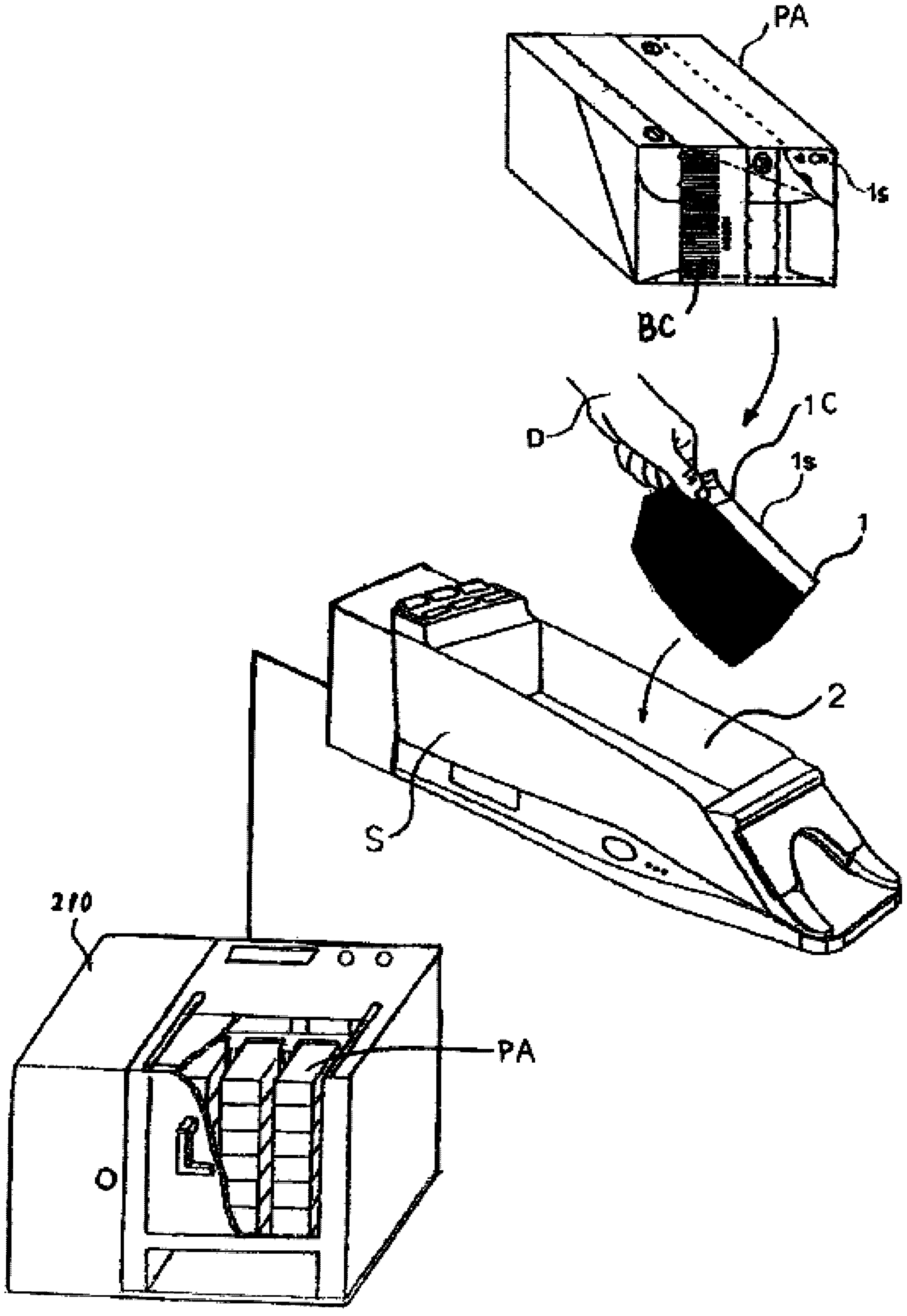
FIG. 5 is a perspective view of a package used with the card shoe and shuffle playing cards with the package removed in the embodiment of the present invention.

The set of shuffle playing cards 1*s* is formed of a predetermined number of decks (typically formed of 4, 6, 8, 10, or 12 decks, and in the case of 8 decks, for example, 52 cards×8 decks=416 cards), shuffled by a shuffler in advance in a manufacturing stage into a randomly arranged cards, packed into a package PA in which the entire circumference of the cards is wrapped, then sealed with a sealing material or a shrinkable packing material, and supplied to a casino and other places, as shown in FIG. 5. In this process, for example, 18 packages PA are packed in a carton CA, as described above, and the packages PA are supplied in the form of the carton and placed in the vicinity of a game table 4 in some cases. Instead, the following cases are conceivable: The playing cards are not shuffled in the manufacturing stage but shuffled by using a shuffler after the playing cards are supplied to a casino or any other place; shuffled playing cards are supplied and then shuffled again; shuffle playing cards 1*s* having been used once are shuffled and used again; or shuffled shuffle playing cards 1*s* are set in an enclosure made, for example, of a plastic material in advance. The barcodes BC (which also serve as stickers) representing different ID codes I are attached to the packages PA and plastic enclosures (not shown). The set of shuffle playing cards 1*s* are so shuffled that the decks have different card arrangements and are therefore unique with respect to one another, and the ID codes I are expressed in the form of the barcodes BC (which also serve as stickers), the QR codes, or any other form for identification of the decks of shuffle playing cards 1*s*.

Figure 6:
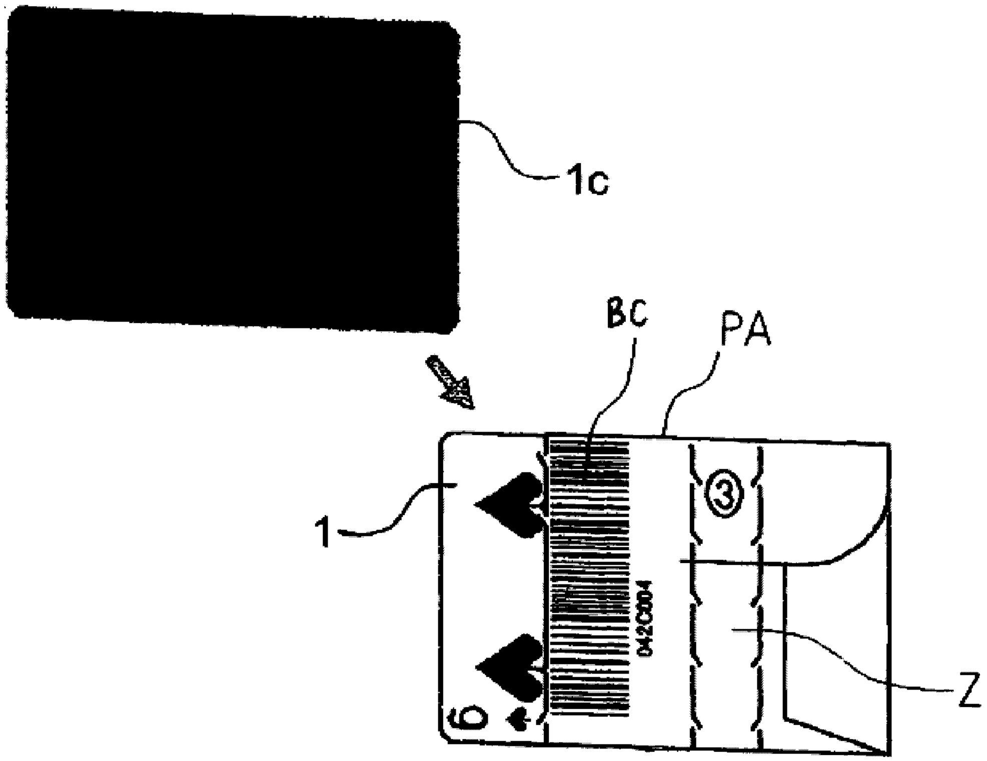
FIG. 6 is a side view of the package of shuffle playing cards into which a cut-card is inserted in the embodiment of the present invention.

To accommodate a set of shuffle playing cards is packed in the form of the package PA described above in the card shoe S, after side surfaces of the package PA are removed along a cutting line Z provided on the package PA so that part of the set of shuffle playing cards 1*s* is exposed, the set of the shuffle playing cards 1*s* is grabbed, lifted, and accommodated in the card accommodating section 2 of the card shoe S, as shown in FIG. 5. Instead, after part of the set of shuffle playing cards 1*s* is exposed, a cut-card 1*c* for stopping use of the set of shuffle playing cards is in the middle of any of the following card games may be inserted (see FIG. 6). After the set of shuffle playing cards 1*s* is accommodated in the card accommodating section 2, part of the remainder of the package PA is removed from the card accommodating section 2, and only the set of shuffle playing cards 1*s* is left in the card accommodating section 2. The accommodation of the cards is thus completed.

The cut-card 1*c* described above is a card inserted, before the set of shuffle playing cards 1*s* is used in a game, into the second half of the set of shuffle playing cards is (the remainder behind the cut-card is about one-fourth or one-fifth the set of shuffle playing cards is). When the shuffle playing cards 1 in the set of shuffle playing cards is accommodated in the card shoe S are drawn one by one and then used in a game, the cut-card 1*c* is used to finish the game with about 20 to 40 cards left in the card shoe S to prevent the players from counting the numbers (ranks) of the dealt cards and predicting the numbers (ranks) of a small number of left shuffle playing cards 1. Typically, when the cut-card 1*c* is drawn, the dealer stops using the set of shuffle playing cards 1*s* accommodated in the card shoe S when the current game ends, when the game in which the cut-card 1*c* has been drawn ends and the following game ends, or when the game in which the cut-card 1*c* has been drawn ends and the following predetermined number of games end, and the shuffle playing cards 1 left in the card shoe S are replaced with a new set of shuffle playing cards 1*s* (hereinafter referred to as "in-shoe package exchange operation").

To perform the in-shoe package exchange operation, the lid 3, provided in an upper portion of the card accommodating section 2, is opened and closed, and the card accommodating section 2 or any other portion may further be provided with a lid open/close sensor 3*s*, which senses the open/close states of the lid 3. An input interface (not shown) that shows the end of use of the shuffle playing cards 1, the start of use of new shuffle playing cards 1, and the start and end of the shoe exchange operation may be separately provided. Further, at the start of use of new shuffle playing cards 1, drawing first a predetermined number of cards and discarding the drawn cards without using them is typically called burning, and the control section 10 described above may be configured to set parameters of the burning and sense that the burning is performed. Moreover, to perform the shoe exchange operation, the card shoe S is powered on and/or off, the control section 10 may sense the powering on and/or off operation.

The management control section 14, which is used in the table game system according to the present invention, will be described with reference to FIG. 1. The management control section 14 receives, when a shuffle playing card 1 is drawn from the card shoe S, a signal sent from the card sensing section 7 and representing that the shuffle playing card 1 has been drawn and determines that how many cards have been drawn in each game on the basis of the received signal. The management control section 14 further receives a signal representing that the result output control section 12 has started outputting a result of game win/loss evaluation of a game and/or a signal representing that the result output control section 12 stops outputting the result.

The management control section 14 may further be configured to receive, in association with the in-shoe package exchange operation, a signal sent from the card sensing section 7 and representing that the cut-card 1*c* and a predetermined number of burning cards have been drawn, receive a signal sent from the sensor 3*s*, which senses the open/close states of the lid 3, which is provided in an upper portion of the card accommodating section 2, and representing that the state of the lid 3 has transitioned from the closed state to the open state, then receive a signal sent from the sensor 3*s* and representing that the state of the lid 3 has transitioned from the open state to the closed state, and further receive input signals sent from the separately provided input interface and representing the end of use of the current shuffle playing cards 1 and the start of use of new shuffle playing cards 1, the start or end of the in-shoe package exchange operation, and the start of bets in a new game. The management control section 14 may still further be configured to sense that the card shoe S has been powered on and/or off. The management control section 14 may further include a package exchange detecting section (not shown) that receives a signal relating to the in-shoe package exchange operation, and the management control section 14 may be configured to receive a signal sent from the package exchange detecting section and representing the start or end of the in-shoe package exchange operation. Further, the package exchange detecting section may be so provided as to be external to the management control section 14.

The management control section 14 is configured to be capable of recording the time (date and time) when each of the signals described above is received as the time when the corresponding specific item has occurred and memorizing the time along with the content of the signal, and the management control section 1 automatically measures the period between at least two of the points of time described above when the corresponding two memorized specific items have occurred. A description will be made of periods measured or calculated by the management control section 14 in one or more games and in the duration to points of time before and after the in-shoe package exchange operation, and a description will be further made of the contents of analysis performed on the basis of the measured or calculated periods. The measured or calculated periods and the contents of the signals described above are recorded in a memory 14M in the management control section 14, transmitted from a transmitter 14*o* to the backyard 208, and used to examine countermeasures and otherwise processed. The periods and contents can be outputted to the output section 11 and the side-surface monitor 13 of the card shoe S, which is connected to the management control section 14 in a wired or wireless manner, and to a separately provided monitor (not shown).

Figure 7:
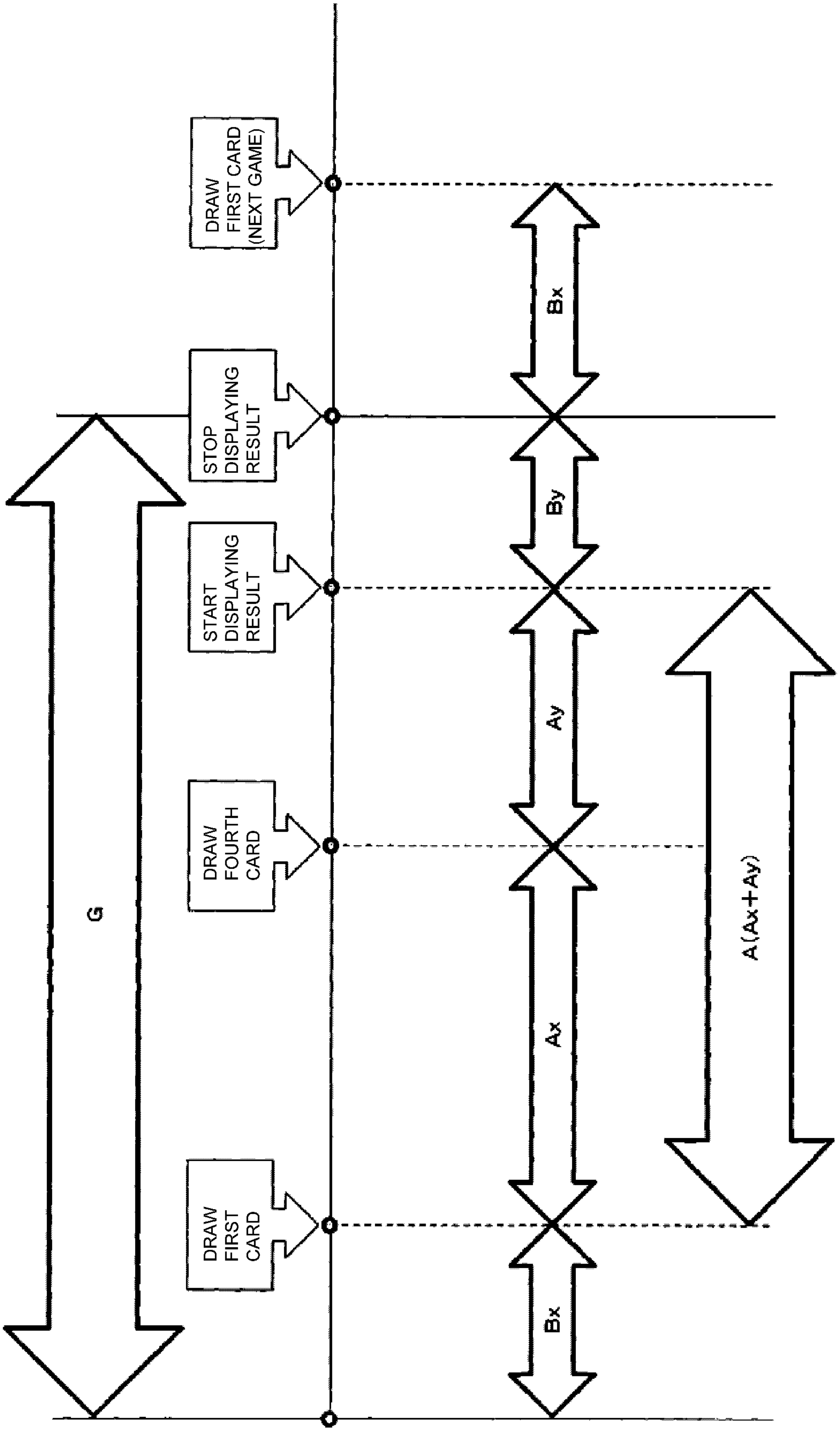
FIG. 7 is a schematic view showing temporal analysis on a game basis in the embodiment of the present invention.

The management control section 14 measures the periods described below in each game, as shown in FIG. 7.

(1) A "dealing period Ax" is measured based on the fact that the "dealing period Ax" starts at the time when a first card is drawn and ends at the time when a fourth card is drawn, and which is measured on the basis of the signal received from the card sensing section 7 and representing that the first and fourth of the shuffle playing cards 1 have been drawn.

(2) A "player's period Ay" is measured based on the fact that the "player's period Ay" starts at the time when the fourth card is drawn, and that the "player's period Ay" ends at the time when the output of a result of win/loss evaluation of the game starts and which is measured on the basis of a signal received from the result output control section 12 and representing the start of the output of a result of win/loss evaluation of the game. (The result output control section 12, which controls start and stop of the result output operation, may be formed of a result output start control section that controls the start of the result output operation and a result output stop control section that controls the stop of the result output operation or may be formed of a single result output control section that control both the start and stop of the output of the result output operation.)

(3) A "bet settlement period By" is measured based on the fact that the "bet settlement period By" starts at the time when the output of a result of win/loss evaluation starts and which is measured on the basis of the signal received from the result output control section 12 and representing the start of the output of a result of win/loss evaluation, and that the "bet settlement period By" ends at the time when the output of a result of win/loss evaluation stops and which is measured on the basis of a signal representing the stop of the output of a result of win/loss evaluation.

(4) A "bet period Bx" is measured based on the fact that the "bet period Bx" starts at the time when the output of a result of win/loss evaluation stops and which is measured on the basis of the signal received from the result output control section 12 and representing the stop of the output of a result of win/loss evaluation in the preceding game, and that the "bet period Bx" ends at the time when a first card is drawn in the current game.

The dealing period Ax and the player's period Ay differ from the other periods, the bet settlement period By and the bet period Bx, in that the former two periods do not greatly relates to the number of punters (players) but can be important in evaluating the dealer D's performance. The former two periods and the latter two periods are therefore considered differently as follows: The sum of the former two periods, the dealing period Ax and player's period Ay, is hereinafter referred to as a "play period A (Ax+Ay);" and the sum of the latter two periods, the bet settlement period By and the bet period Bx, is hereinafter referred to as a "period excluding the play B (Bx+By)." Further, the period from the start to the end of a single game, that is, the sum of the dealing period Ax, the player's period Ay, the bet settlement period By, and the bet period Bx is referred to as a "game period G." The management control section 14 can further measure or calculate the "play period A (Ax+Ay)," the "period excluding the play B (Bx+By)," and the "game period G," as will be described below.

(5) The "play period A (Ax+Ay)" is measured based on the fact that the "play period A (Ax+Ay)" starts at the time when a first card is drawn and which is measured on the basis of a signal received from the card sensing section 7 and representing that the first of the shuffle playing cards 1 is drawn, and that "play period A (Ax+Ay)" ends at the time when the output of a result of win/loss evaluation starts and which is measured on the basis of the signal received from the result output control section 12 and representing the start of the output of a result of win/loss evaluation of the game.

(6) The measured "dealing period Ax" and "player's period Ay" are added to each other to calculate the "play period A (Ax+Ay)."

(7) The measured "bet settlement period By" and "bet period Bx" are added to each other to calculate the "period excluding the play B (Bx+By)."

(8) The "game period G" is measured on the basis of the fact that the "game period G" starts at the time when the output of a result of win/loss evaluation stops and which is measured on the basis of the signal received from the result output control section 12 and representing the stop of the output of a result of win/loss evaluation in the preceding game, and that "game period G" ends at the time when the output of a result of win/loss evaluation stops and which is measured on the basis of a signal representing the stop of the output of a result of win/loss evaluation in the current game.

(9) The measured "play period A (Ax+Ay)" and "period excluding the play B (Bx+By)" are added to each other to calculate the "game period G."

(10) The measured "dealing period Ax," "player's period Ay," "bet settlement period By," and "bet period Bx" are summed to calculate the "game period G."

(11) Further, the management control section 14 may be configured to measure the "period excluding the play B (Bx+By)" based on the fact that the "period excluding the play B (Bx+By)" starts at the time when the output of a result of win/loss evaluation starts and which is measured on the basis of the signal received from the result output control section 12 and representing the start of the output of a result of win/loss evaluation, and that the "period excluding the play B (Bx+By)" ends at the time when a first card is drawn in the following game.

The "dealing period Ax," the "player's period Ay," the "bet settlement period By," the "bet period Bx," the "play period A (Ax+Ay)," the "period excluding the play B (Bx+By)," and the "game period G" measured in games by the management control section 14 can be used to calculate and analyze the ratio between a plurality of the items described above (ratio of one of the periods to another of the other periods). For example, when a dealer spends a long "dealing period" as compared with the "game period," an instruction on "dealing" can be given to the dealer or any other countermeasure can be taken. Further, the "dealing period Ax," the "player's period Ay," the "bet settlement period By," the "bet period Bx," the "play period A (Ax+Ay)," the "period excluding the play B (Bx+By)," and the "game period G" can be measured over a plurality of games for calculation of the average of the periods of each of the types (the sum of the periods of each of the types over a plurality of games divided by the number of games). The number of games described above can be found, for example, by calculating the number of start or end actions of games sensed by a counter (not shown) with which the management control section 14 is provided. Further, in addition to calculating the sum and average of periods spent by each dealer D, calculating the sum and average of periods spent by a plurality of dealers D and comparing results of the calculation with one another, for example, on a casino floor basis and on a time frame basis allow acquisition of information, for example, on a floor where the bet settlement period tends to be long. Moreover, it is expected that a daytime game period and a nighttime game period differ from each other due, for example, to fatigue of the dealer D and the punters (players) C, and the cause of the difference can be analyzed in detail. For example, the cause may come from a longer "bet period Bx" spent in the nighttime by the punters (players) C and the tendency of the dealer D to spend a longer "dealing period Ax." Further, on the basis of data recognized by the casino based on past experiences and performance and representing how long each of the "dealing period Ax," the "player's period Ay," the "bet settlement period By," the "bet period Bx," the "play period A (Ax+Ay)," the "period excluding the play B (Bx+By)," and the "game period G" takes, the management control section 14 can set a corresponding standard guideline period. When any of the periods described above exceeds the corresponding set standard guideline period, the management control section 14 can transmit a signal to the card shoe S and the backyard 208 to cause the output section 11 and the side-surface monitor 13 of the card shoe S to display that the period has exceeded the standard guideline period and further record the fact that the period has exceeded the standard guideline period in the memory 14M.

The memory 14M in the management control section 14 further memorizes the rules of baccarat and a pre-specified item to be sensed as an error, and the management control section 14 can sense an error state that is against the rules of the game or has been specified in advance, transmit a signal to the card shoe S and the backyard 208 to cause the output section 11 and the side-surface monitor 13 of the card shoe S to display that the error state has been detected, and further record the fact that the error state has been detected in the memory 14M. The error state includes, for example, the follow states:

(a) A case where in each game, after the win/loss evaluating section 9 performs the win/loss evaluation, but before the output section 11 starts outputting the result of the win/loss evaluation, another of the shuffle playing cards 1 is or has been drawn from the card shoe S.

(b) A case where in each game, after the output section 11 starts outputting a result of the win/loss evaluation, but before the output section 11 stops outputting the result of the win/loss evaluation, another of the shuffle playing cards 1 is or has been drawn from the card shoe S.

Figure 12:
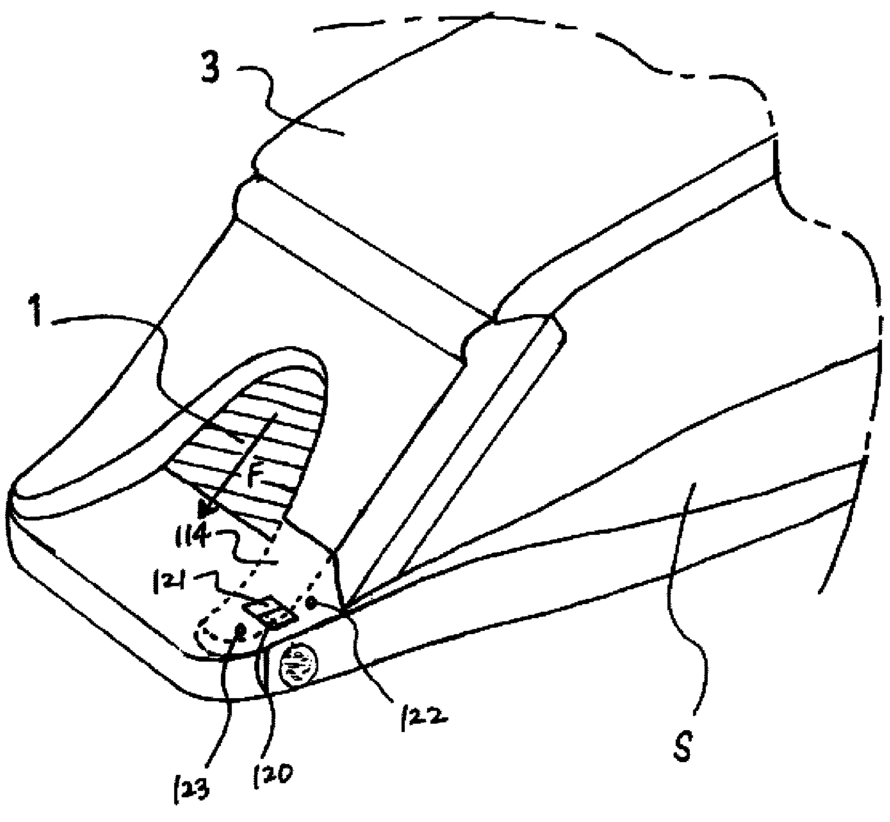
FIG. 12 is an enlarged perspective view with part of a card guiding section of the card shoe cut in the embodiment of the present invention.

(c) A case where when one of the shuffle playing cards 1 is drawn from the card shoe S, the shuffle playing card 1 stays for a predetermined period or longer in the vicinity of the opening 6, or the shuffle playing card 1 moves in the direction opposite the direction F in which the shuffle playing card 1 is drawn (see FIG. 12).

(d) A case where when one of the shuffle playing cards 1 is drawn from the card shoe S, a result of the reading of the shuffle playing card 1 performed by the card reading section 8 does not satisfy a pre-specified reference, or the shuffle playing card 1 has not been read by the card reading section 8.

The management control section 14 can sense that the system has recovered from the error state, further calculate an error recovery period from the time when the error state has been sensed to the time when the management control section 14 senses that the system has recovered from the error state, and further record a result of the calculation in the memory 14M. The recovery from the error states is, for example, any of the following states:

(a) A state in which (in correspondence with the error in the case where in each game, after the win/loss evaluating section 9 performs the win/loss evaluation, but before the output section 11 starts outputting the result of the win/loss evaluation, another of the shuffle playing cards 1 is or has been drawn from the card shoe S) the output section 11 starts outputting the result of win/loss evaluation.

(b) A state in which (in correspondence with the error in the case where in each game, after the output section 11 starts outputting a result of the win/loss evaluation, but before the output section 11 stops outputting the result of the win/loss evaluation, another of the shuffle playing cards 1 is or has been drawn from the card shoe S) the output section 11 stops outputting the result of the win/loss evaluation.

(c) A state in which (in correspondence with the error in the case where when one of the shuffle playing cards 1 is drawn from the card shoe S, the shuffle playing card 1 stays for a predetermined period or longer in the vicinity of the opening 6 or the shuffle playing card 1 moves in the direction opposite the direction F in which the shuffle playing card 1 is drawn (see FIG. 12), or in correspondence with the error in the case where when the shuffle playing card 1 is drawn from the card shoe S, a result of the reading of the shuffle playing card 1 performed by the card reading section 8 does not satisfy a pre-specified reference or the shuffle playing card 1 has not been read by the card reading section 8) the following shuffle playing card 1 has been drawn from the card shoe S in the course of the game.

(d) A state in which an input signal representing that the system has recovered from the error state has been received from a reset switch (not shown) provided in the card shoe S or the management control section 14 or a reset switch (not shown) provided separately therefrom.

The management control section 14 is further provided with a mode switcher 14*s*, which receives a signal and switches the mode in accordance with which the management control section 14 operates to a period measurement omission mode in which the period between the points of time when the memorized specific items occur is not measured. The period after the dealer D or any other person performs operation of switching the operation mode to the period measurement omission mode and while the period measurement omission mode is maintained, that is, the period from the time when the mode switcher 14*s* has switched the operation mode to the period measurement omission mode to the time when the period measurement omission mode is changed to the normal mode is calculated as a period measurement omission period that is a period excluding the "dealing period Ax," the "player's period Ay," the "bet settlement period By," the "bet period Bx," the "play period A (Ax+Ay)," the "period excluding the play B (Bx+By)," the "game period G," and the "error recovery period" described above. For example, in a period for which no punter (player) C is present and no game is therefore initiated (which is "waiting-for-punter period EX" or a period after the preceding game including the bet settlement has ended and the management control section 14, if no action is made, starts measuring a period as the bet period in the following game), the dealer D can avoid a situation in which the "waiting-for-punter period EX" is undesirably contained in the "bet period Bx," the "period excluding the play B (Bx+By)," and the "game period G" described above by operating the mode switcher 14*s* to switch the operation mode to the period measurement omission mode. The mode switcher 14*s* may be provided on the card shoe S or may be provided separately therefrom.

Figure 8:
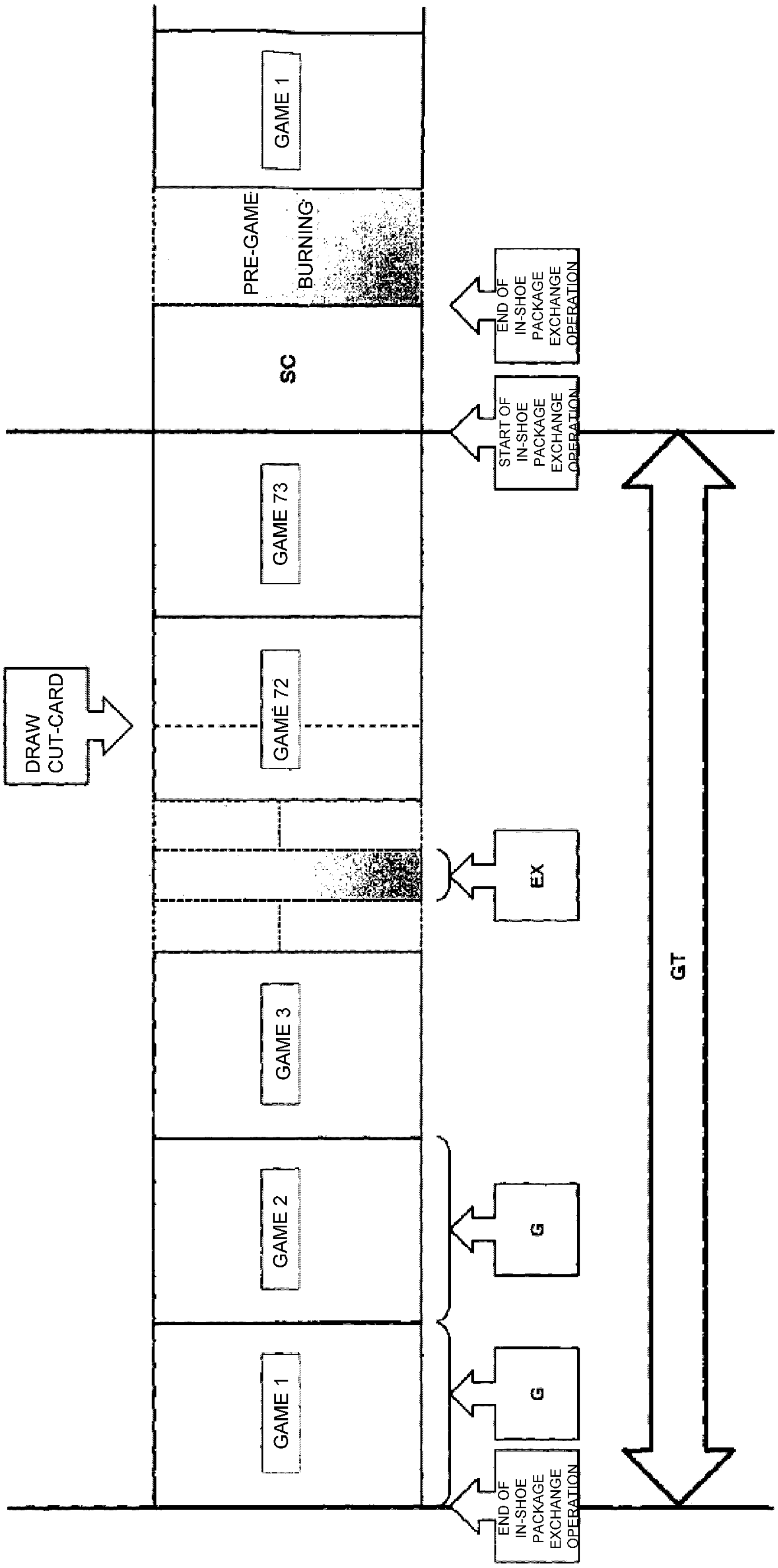
FIG. 8 is a schematic view showing temporal analysis on a shoe basis in the embodiment of the present invention.

A description will next be made of a period measured by the management control section 14 in the period from the point of time when the "in-shoe package exchange operation" described above ends, that is, the point of time when use of a new set of shuffle playing cards is starts to the point of time when the use of the set of shuffle playing cards is ends and the "in-shoe package exchange operation" is performed again and completed (see FIG. 8).

(1) A "period GT for which shuffle playing cards on a package basis or on a set basis are used" is measured on the basis of the fact that the "shuffle playing card use period GT" starts at the time measured on the basis of reception of the signal representing the end of the in-shoe package exchange operation or the state in which the card shoe S has been powered on, and that the "shuffle playing card use period GT" ends at the time measured on the basis of reception of the signal representing the start of the in-shoe package exchange operation or the state in which the card shoe S has been powered off.

(2) A "in-shoe package exchange period SC" is measured on the basis of the fact that the "in-shoe package exchange period SC" starts at the time measured on the basis of reception of the signal representing the start of the in-shoe package exchange operation or the state in which the card shoe S has been powered off, and that the "in-shoe package exchange period SC" ends at the time measured on the basis of reception of the signal representing the end of the in-shoe package exchange operation or the state in which the card shoe S has been powered on.

The signal representing the start of the in-shoe package exchange operation is, for example, any of the following signals:

(a) A signal received from the sensor 3*s*, which detects the open/close states of the lid 3 provided in an upper portion of the card accommodating section 2 of the card shoe S, and representing that the state of the lid 3 has transitioned from the closed state to the open state.

(b) A signal representing the end of the output of a result of win/loss evaluation of a game in which the cut-card 1*c* inserted into the shuffle playing cards is accommodated in the card accommodating section 2 has been drawn or the last game of a predetermined number of games that follow the game in which the cut-card 1*c* has been drawn.

(c) A signal received from the lid open/close sensor 3*s* and representing that the state of the lid 3, which is provided in an upper portion of the card accommodating section 2, has transitioned from the closed state to the open state after the cut-card 1*c* has been drawn.

(d) An input signal received from the separately provided input interface (not shown) and representing the end of use of the shuffle playing cards or the start of the in-shoe package exchange operation.

Further, the signal representing the end of the in-shoe package exchange operation is, for example, any of the following signals:

(e) A signal received from the sensor 3*s*, which detects the open/closed states of the lid 3 provided in an upper portion of the card accommodating section 2 of the card shoe S, and representing that the state of the lid 3 has transitioned from the open state to the closed state.

(f) A signal representing that a predetermined number of the shuffle playing cards 1 (burning cards) have been drawn from the card shoe S.

(g) A signal representing the start of bets in a game.

(h) An input signal received from the separately provided input interface (not shown) and representing the start of use of shuffle playing cards or the end of the in-shoe package exchange operation.

The "period GT for which shuffle playing cards on a package basis or on a set basis are used" and the "in-shoe package exchange period SC" measured by the management control section 14 can be used to calculate and analyze the ratio between the periods described above (ratio of one of the periods to the other period). For example, when a dealer D spends a long "in-shoe package exchange period SC" as compared with the "period GT for which shuffle playing cards on a package basis or on a set basis are used," an instruction on "in-shoe package exchange operation" can be given to the dealer or any other countermeasure can be taken.

Figure 9:
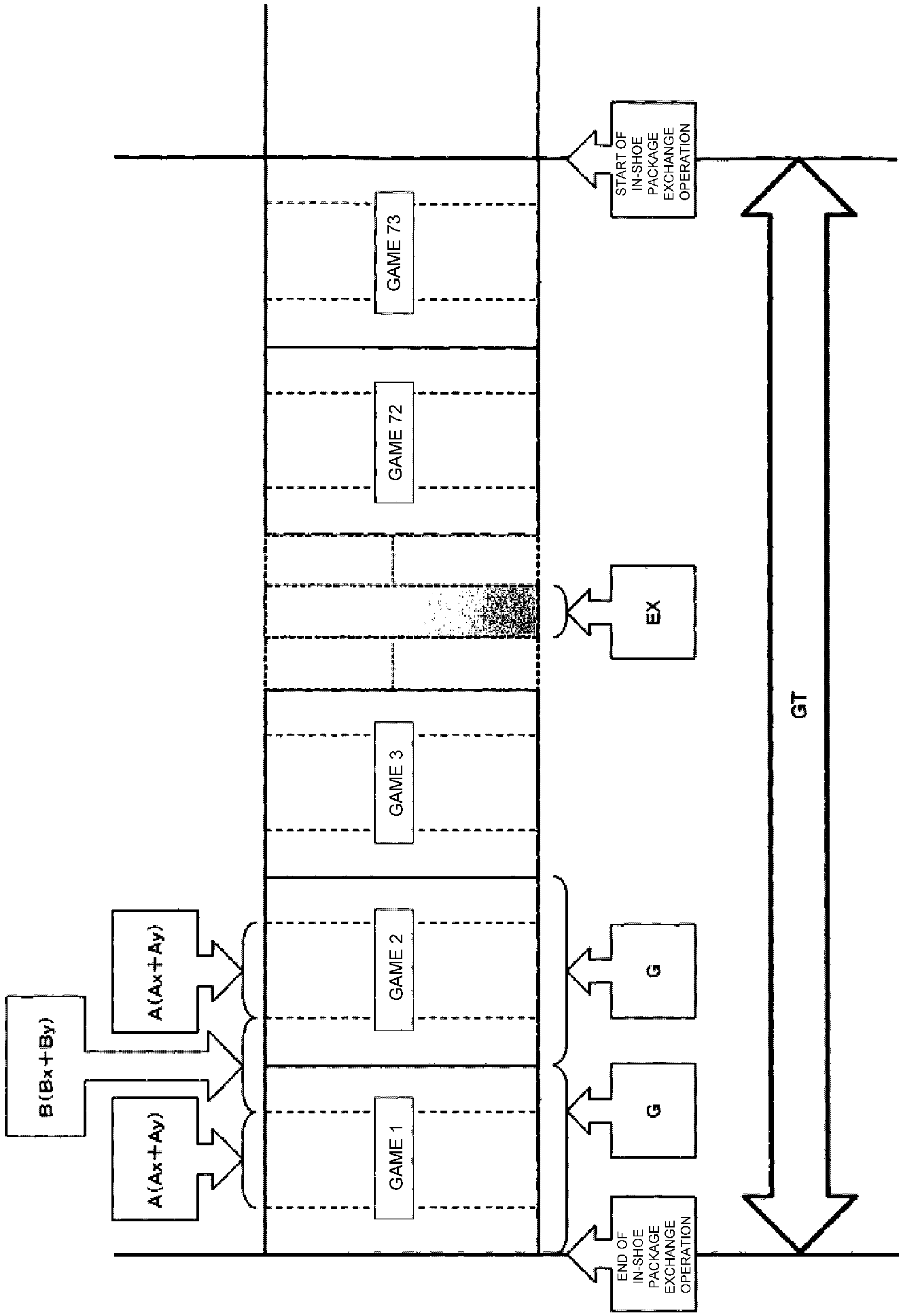
FIG. 9 is a schematic view showing temporal analysis on a game basis and on a shoe basis in the embodiment of the present invention.

Further, a description will be made of detailed periods further measured and calculated by the management control section 14 in the period from the point of time of the end of the "in-shoe package exchange operation," that is, the point of time of the start of use of a new set of shuffle playing cards is to the point of time the end of the use of the set of shuffle playing cards 1*s* and the start of the "in-shoe package exchange operation" again (see FIG. 9).

(1) The "period GT for which shuffle playing cards on a package basis or on a set basis are used" is measured on the basis of the fact that the "shuffle playing card use period GT" starts at the time measured on the basis reception of the signal representing the end of the in-shoe package exchange operation or the state in which the card shoe S has been powered on, and that the "shuffle playing card use period GT" ends at the time measured on the basis of reception of the signal representing the start of the in-shoe package exchange operation or the state in which the card shoe S has been powered off.

The signal representing the start of the in-shoe package exchange operation is, for example, any of the following signals:

(a) The signal received from the sensor 3*s*, which detects the open/close states of the lid 3 provided in an upper portion of the card accommodating section 2 of the card shoe S, and representing that the state of the lid 3 has transitioned from the closed state to the open state.

(b) The signal representing the end of the output of a result of win/loss evaluation of a game in which the cut-card 1*c* inserted into the shuffle playing cards is accommodated in the card accommodating section 2 has been drawn or the last game of a predetermined number of games that follow the game in which the cut-card 1*c* has been drawn.

(c) The signal received from the lid open/close sensor 3*s* and representing that the state of the lid 3, which is provided in an upper portion of the card accommodating section 2, has transitioned from the closed state to the open state after the cut-card 1*c* has been drawn.

(d) The input signal received from the separately provided input interface (not shown) and representing the end of use of the shuffle playing cards or the start of the in-shoe package exchange operation.

Further, the signal representing the end of the in-shoe package exchange operation is, for example, any of the following signals:

(e) The signal received from the sensor 3*s*, which detects the open/closed states of the lid 3 provided in an upper portion of the card accommodating section 2 of the card shoe S, and representing that the state of the lid 3 has transitioned from the open state to the closed state.

(f) The signal representing that a predetermined number of the shuffle playing cards 1 (burning cards) have been drawn from the card shoe S.

(g) The signal representing the start of bets in a game.

(h) The input signal received from the separately provided input interface (not shown) and representing the start of use of shuffle playing cards or the end of the in-shoe package exchange operation.

(2) The "dealing period Ax," which starts at the time when a first card is drawn and ends at the time when a fourth card is drawn, is measured on the basis of the signal received from the card sensing section 7 and representing that the first and fourth of the shuffle playing cards 1 have been drawn, and the sum, average, and dispersion (value representing variation in data) of the "dealing periods Ax" in games in the "period GT for which shuffle playing cards on a package basis or on a set basis are used" are calculated. The sum of the periods is the sum of the "dealing periods Ax" in all games played in the "period GT for which shuffle playing cards on a package basis or on a set basis are used" (games 1 to 73 in FIG. 9, for example), and the average of the periods is the sum of the periods divided by the number of games ("73 games" in FIG. 9, for example). The number of games described above can be found, for example, by calculating the number of start or end actions of games sensed by a counter (not shown) with which the management control section 14 is provided or calculating the number measurement actions of the "dealing periods Ax." Further, the dispersion is a value representing variation in data on the "dealing periods Ax" and calculated by using the difference between the "dealing period Ax" in each game and the average period. Further, these values are used to display how the "dealing period Ax" in each game changes as the number of games increases in the form of a graph or a table, whereby the progress and distribution of the "dealing period Ax" can be grasped.

(3) The "player's period Ay" is measured based on the fact that the "player's period Ay" starts at the time when the fourth card is drawn, and that the "player's period Ay" ends at the time when the output of a result of win/loss evaluation of the game starts and which is measured on the basis of the signal received from the result output control section 12 and representing the start of the output of a result of win/loss evaluation, and the sum, average, and dispersion of the "player's periods Ay" in the games in the "period for which the shuffle playing cards on a package basis or on a set basis are used" are similarly calculated. Results of the calculation are used to perform detailed analysis (such as grasp of progress and distribution of "player's period Ay") and examination of countermeasures.

(4) The "bet settlement period By" is measured based on the fact that the "bet settlement period By" starts at the time when the output of a result of win/loss evaluation starts and which is measured on the basis of the signal received from the result output control section 12 and representing the start of the output of a result of win/loss evaluation, and that the "bet settlement period By" ends at the time when the output of a result of win/loss evaluation stops and which is measured on the basis of the signal representing the stop of the output of a result of win/loss evaluation, and the sum, average, and dispersion of the "bet settlement periods By" in the games in the "period for which the shuffle playing cards on a package basis or on a set basis are used" are similarly calculated. Results of the calculation are used to perform detailed analysis (such as grasp of progress and distribution of "bet settlement periods By") and examination of countermeasures.

(5) The "bet period Bx" is measured based on the fact that the "bet period Bx" starts at the time when the output of a result of win/loss evaluation stops and which is measured on the basis of the signal received from the result output control section 12 and representing the stop of the output of a result of win/loss evaluation in the preceding game, and that the "bet period Bx" ends at the time when a first card is drawn in the current game, and the sum, average, and dispersion of the "bet periods Bx" in the games in the "period for which the shuffle playing cards on a package basis or on a set basis are used" are similarly calculated. Results of the calculation are used to perform detailed analysis (such as grasp of progress and distribution of "bet period Bx") and examination of countermeasures.

(6) The "play period A (Ax+Ay)" is measured based on the fact that the "play period A (Ax+Ay)" starts at the time when a first card is drawn and which is measured on the basis of the signal received from the card sensing section 7 and representing that the first of the shuffle playing cards 1 is drawn, and that "play period A (Ax+Ay)" ends at the time when the output of a result of win/loss evaluation starts and which is measured on the basis of the signal received from the result output control section 12 and representing the start of the output of a result of win/loss evaluation of the game, and the sum, average, and dispersion of the "play periods A (Ax+Ay)" in the games in the "period for which the shuffle playing cards on a package basis or on a set basis are used" are similarly calculated. Results of the calculation are used to perform detailed analysis (such as grasp of progress and distribution of "play periods A (Ax+Ay)") and examination of countermeasures.

(7) The measured "bet settlement period By" and "bet period Bx" are added to each other to calculate the "period excluding the play B (Bx+By)," and the sum, average, and dispersion of the "periods excluding the play B (Bx+By)" in the games in the "period for which the shuffle playing cards on a package basis or on a set basis are used" are similarly calculated. Results of the calculation are used to perform detailed analysis (such as grasp of progress and distribution of "period excluding the play B (Bx+By)") and examination of countermeasures.

(8) The "game period G" is measured on the basis of the fact that the "game period G" starts at the time when the output of a result of win/loss evaluation stops and which is measured on the basis of the signal received from the result output control section 12 and representing the stop of the output of a result of win/loss evaluation in the preceding game, and that "game period G" ends at the time when the output of a result of win/loss evaluation stops and which is measured on the basis of the signal representing the stop of the output of a result of win/loss evaluation in the current game, and the sum, average, and dispersion of the "game periods G" in the games in the "period for which the shuffle playing cards on a package basis or on a set basis are used" are similarly calculated. Results of the calculation are used to perform detailed analysis (such as grasp of progress and distribution of "game periods G") and examination of countermeasures.

The memory 14M in the management control section 14 memorizes the rules of baccarat and a pre-specified item to be sensed as an error, and the management control section 14 can sense an error state that is against the rules of the game or has been specified in advance, transmit information on the number and contents of sensed errors in the "period GT for which the shuffle playing cards on a package basis or on a set basis are used" to the card shoe S and the backyard 208 to cause the output section 11 and the side-surface monitor 13 of the card shoe S to display the information, and further record the fact that the error states have been detected and the number and contents of sensed errors in the memory 14M. The number of errors may be sensed by the counter (not shown) further provided in the management control section 14. The content of an error state is, for example, any of the following state:

(a) A case where in each game, after the win/loss evaluating section 9 performs the win/loss evaluation, but before the output section 11 starts outputting the result of the win/loss evaluation, another of the shuffle playing cards 1 is or has been drawn from the card shoe S.

(b) A case where in each game, after the output section 11 starts outputting a result of the win/loss evaluation, but before the output section 11 stops outputting the result of the win/loss evaluation, another of the shuffle playing cards 1 is or has been drawn from the card shoe S.

(c) A case where when one of the shuffle playing cards 1 is drawn from the card shoe S, the shuffle playing card 1 stays for a predetermined period or longer in the vicinity of the opening 6, or the shuffle playing card 1 moves in the direction opposite the direction F in which the shuffle playing card 1 is drawn (see FIG. 12).

(d) A case where when one of the shuffle playing cards 1 is drawn from the card shoe S, a result of the reading of the shuffle playing card 1 performed by the card reading section 8 does not satisfy a pre-specified reference, or the shuffle playing card 1 has not been read by the card reading section 8.

The management control section 14 can sense that the system has recovered from the error state, further calculate an error recovery period from the time when the error state has been sensed to the time when the management control section 14 senses that the system has recovered from the error state in the "period GT for which shuffle playing cards on a package basis or on a set basis are used," further calculate the sum, average, and dispersion of the error recovery periods, and further record results of the calculation in the memory 14M. Results of the calculation are used to perform detailed analysis (such as grasp of progress and distribution of the error recovery period) and examination of countermeasures. The sum of the periods is the sum of all the error recovery periods calculated in the "period GT for which shuffle playing cards on a package basis or on a set basis are used," and the average period is the sum of the error recovery periods divided by the number of errors. Further, the dispersion is a value representing variation in data on the error recovery period and calculated by using the difference between each of the error recovery periods in the case where any of the error states described above occurs and the average period. Further, these values are used to display how the error recovery period changes as the number of actions of recovery from an error increases in the form of a graph or a table, whereby the progress and distribution of the error recovery period can be grasped. Further, the grasp of how the number and contents of errors and the error recovery period change as the number of games increases allows grasp of tendency of the errors and the degree of contribution of the countermeasures. The recovery from the error states is, for example, any of the following states:

(a) The state in which (in correspondence with the error in the case where in each game, after the win/loss evaluating section 9 performs the win/loss evaluation, but before the output section 11 starts outputting the result of the win/loss evaluation, another of the shuffle playing cards 1 is or has been drawn from the card shoe S) the output section 11 starts outputting the result of win/loss evaluation (b) The state in which (in correspondence with the error in the case where in each game, after the output section 11 starts outputting a result of the win/loss evaluation, but before the output section 11 stops outputting the result of the win/loss evaluation, another of the shuffle playing cards 1 is or has been drawn from the card shoe S) the output section 11 stops outputting the result of the win/loss evaluation (c) The state in which (in correspondence with the error in the case where when one of the shuffle playing cards 1 is drawn from the card shoe S, the shuffle playing card 1 stays for a predetermined period or longer in the vicinity of the opening 6 or the shuffle playing card 1 moves in the direction opposite the direction F in which the shuffle playing card 1 is drawn (see FIG. 12), or in correspondence with the error in the case where when one of the shuffle playing cards 1 is drawn from the card shoe S, a result of the reading of the shuffle playing card 1 performed by the card reading section 8 does not satisfy a pre-specified reference or the shuffle playing card 1 has not been read by the card reading section 8) the following shuffle playing card 1 has been drawn from the card shoe S in the course of the game (d) The state in which an input signal representing that the system has recovered from the error state has been received from a reset switch (not shown) provided in the card shoe S or the management control section 14 or a reset switch (not shown) provided separately therefrom The "sum or average of the dealing periods Ax," the "sum or average of the player's periods Ay," the "sum or average of the bet settlement periods By," the "sum or average of the bet periods Bx," the "sum or average of the play periods A (Ax+Ay)," the "sum or average of the periods excluding the play B (Bx+By)," the "sum or average of the game periods G," the "in-shoe package exchange period SC," and the "sum or average of the error recovery periods" measured in games by the management control section 14 can be used to calculate and analyze the ratio between a plurality of the items described above for contribution to countermeasures. For example, when a dealer D spends a long "average error recovery period" as compared with the "average game period G," an instruction and training on the error recovery or any other measure can be given to the dealer or any other countermeasure can be taken. Further, measurement of the game period G on a dealer D basis and comparison of the results of the measurement with one another can contribute to evaluation of the performance of the dealers D on the basis of the length of the "sum or average of the game periods G." Further, calculation of the number of errors caused by the dealers D on a dealer D basis can contribute to countermeasures for error prevention and performance evaluation.

Further, on the basis of data recognized by the casino based on past experiences and performance and representing how long each of the "dealing period Ax," the "player's period Ay," the "bet settlement period By," the "bet period Bx," the "play period A (Ax+Ay)," the "period excluding the play B (Bx+By)," the "game period G," the "in-shoe package exchange period SC," and the "sum or average of the error recovery periods" takes, the management control section 14 can set a corresponding standard guideline period. When any of the periods described above exceeds the corresponding set standard guideline period, or when the management control section 14 calculates the averages of the periods described above in a plurality of games and any of the averages exceeds the corresponding set standard guideline period, the management control section 14 can transmit a signal to the card shoe S and the backyard 208 to cause the output section 11 and the side-surface monitor 13 of the card shoe S to display that the period or the average has exceeded the standard guideline period and further record the fact that the period or the average has exceeded the standard guideline period in the memory 14M. For example, when the average of "game periods G" of a certain dealer exceeds the standard guideline period at the point of time when 10 games end, the side-surface monitor 14 of the card shoe S displays that the average of "game periods G" has exceeded the standard guideline period to allow the dealer to take countermeasures that shorten the following game periods. Further, the fact that the average of "game periods G" has exceeded the standard guideline period is conveyed to the backyard 208, and a person in standby in the backyard 208 or any other person can examine a cause of the exceedance and examine countermeasures against the cause.

The dealer D can be identified by the management control section 14 or the card shoe S or dealer ID sensing means (not shown) provided separately therefrom. The dealer ID sensing means is configured to read an ID code provided on the nameplate or any other identifier plate of a dealer D and identifying the dealer D. Instead, the dealer ID sensing means may be configured, as another example, to receive, as an input, a numeral or an alphabetical letter that identifies a dealer D. The identification information on a sensed dealer D is memorized along with the period between the points of time when specific items occur and which are measured by the management control section 14 or with the identification information related to the period.

In the present table game system, in a position above each of the game tables 4, the monitoring camera 212, which monitors the bet area BA on the game table 4, is installed, as shown in FIG. 3, and the management control section 14 is connected in a wired or wireless manner to bet area sensing means (not shown) for sensing the chips W placed in the bet area BA on the basis of information from the monitoring camera 212. The management control section 14 then determines whether "the punters (players) C squeeze only the player's hand (first and third cards, further including fifth and sixth cards in some cases) or only the banker's hand (second and fourth cards, further including fifth and sixth cards in some cases) or the punters (players) C squeeze both the player's and banker's hands," that is, "the hand to be squeezed by the punters (players) C is formed of one type of hand (only player's hand or banker's hand) or two types of hand (both player's and banker's hands)" on the basis of the following information on the chips sensed by the bet area sensing means:

(1) whether a chip W has been bet in the player area of the bet area BA; and (2) whether a chip W had been bet in the banker area of the bet area BA.

Since the squeeze operation is an interesting action for the punters (players) C who paly baccarat, and some punters (players) C spend a long time in some cases, the squeeze period is likely to greatly affect the "player's period Ay," the "play period A (Ax+Ay)," and the "game period G." The management control section 14 then memorize information on the squeeze operation with the information related to the "player's period Ay," the "play period A (Ax+Ay)," and the "game period G."

The management control section 14 is further configured to calculate the number of punters (players) C who are participating the game out of the punters around the game table 4 on the basis of the information representing the chips W placed in the bet area BA and sensed by the bet area sensing means (not shown). The number of punters (players) C is likely to greatly affect the "bet period Bx," the "bet settlement period By," the "period excluding the play B (Bx+By)," and the "game period G." For example, the periods required for the "bet period Bx" and the "bet settlement period By" in a case where there is one punter (player) C should inevitably differ from the periods in a case where there are six punters (players) C. The management control section 14 therefore memorizes information on the number of punters (players) C with the information related to the "bet period Bx," the "bet settlement period By," the "period excluding the play B (Bx+By)," and the "game period G." Memorizing the "bet period Bx," the "bet settlement period By," the "period excluding the play B (Bx+By)," and the "game period G" for each number of punters (players) C allows more accurate analysis of the game period.

Figure 10:
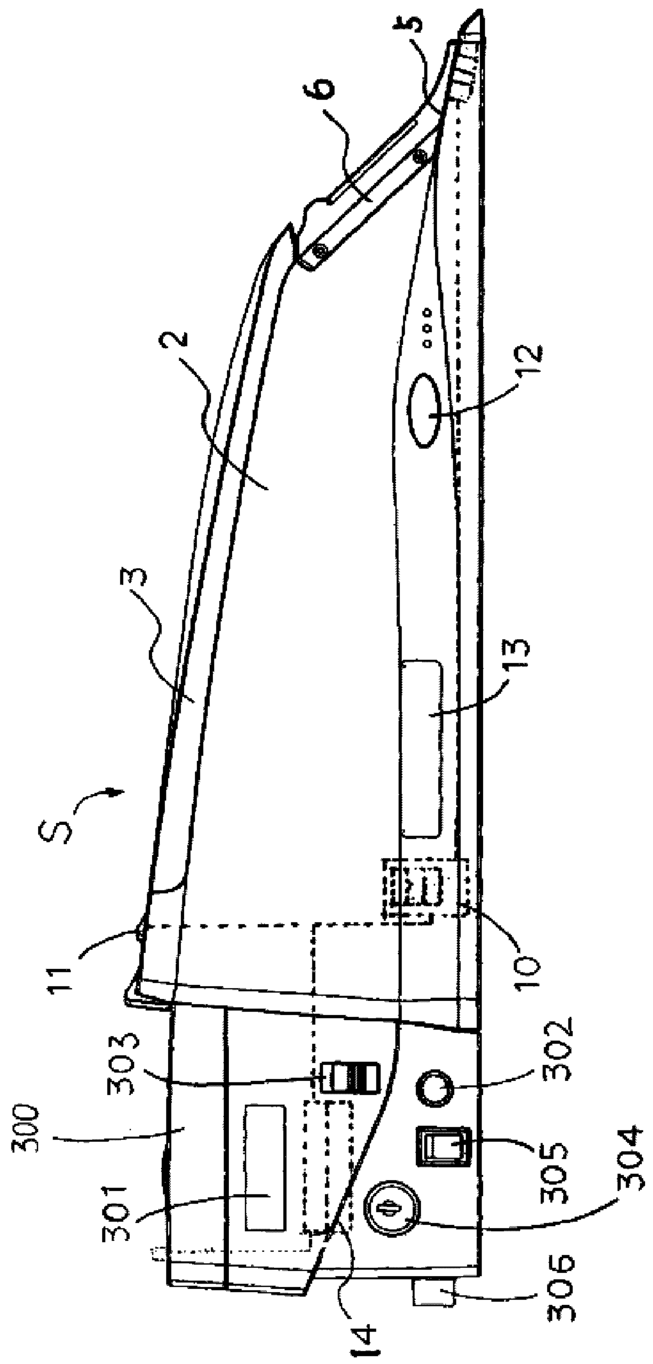
FIG. 10 is a side view of the card shoe and the management control section connected to the card shoe in the embodiment of the present invention.

Further, the structure of the management control section 14 will be described. FIG. 10 is a side view of the card shoe S and the management control section 14 connected to the card shoe S in the embodiment of the present invention. The management control section 14 is accommodated in a box-shaped apparatus 300, and the box-shaped apparatus 300 has a structure attachable to and detachable from the rear of the card shoe S. The management control section 14 is connected in a wired or wireless manner to the control section 10 including the win/loss evaluating section 9, the output section 11, the result output control section 12, and the side-surface monitor 13 in the card shoe S. The box-shaped apparatus 300 further includes a barcode reader 301, which reads the barcode BC provided on the package PA containing the shuffle playing cards 1 to be used next, a lock button 302, a lock release button 303, and a key switch 304, which deactivate the management control section 14, activate the deactivated management control section 14, and switch the operation mode of the management control section 14 to another, a power switch 305, which powers on and off the management control section 14, and a power connector 306, and each of the components described above is connected to the management control section 14 in a wired or wireless manner. The barcode reader 301 may be configured to also play a role of the dealer ID sensing means described above, and the power switch 305 and the power connector 306 preferably also serve as the power switch and the power connector of the card shoe S. The configuration in which the power switch 305 and the power connector 306 also serve as the power switch and the power connector of the card shoe S can prevent the card shoe S from being used with the management control section 14 powered off, whereby security of the card shoe S can be increased. Further, as another embodiment of the present invention, the management control section 14 may be formed in the card shoe S or may be part of the control section 10 of the card shoe S.

Finally, the card sensing section 7 and the card reading section 8, which read the code C representing the rank (numeral) of a card 1 from the card 1 when the card 1 is drawn from the card accommodating section 2, will be described in detail with reference to FIG. 12. FIG. 12 is a key part enlarged perspective view showing a state in which the card sensing section 7 and the card reading section 8 located at the front end of the card shoe S are exposed. In FIG. 12, the card sensing section 7 and the card reading section 8 are provided in the card guiding section 5, which guides the cards 1 drawn one by one through the front opening 6 of the card accommodating section 2 onto the game table 4. The card guiding section 5 is an inclining surface, and card guiding covers 114, which also serve as a sensor cover, are attached to the inclining surface along the edges thereof on opposite sides. The two card guiding covers 114 can be attachable and detachable by using screws or any other fasteners (not shown). When the card guides 114 are removed, four sensors, which form the card sensing section 7 and the card reading section 8, are exposed. The four sensors are formed of two ultraviolet responsive sensors (UV sensors) 120 and 121 and target detecting sensors 122 and 123.

The target detecting sensors 122 and 123 are each an optical fiber sensor that senses whether or not a card 1 is present and can detect the movement of the card 1. The target detecting sensor 122 is located on the upstream side of the card guiding section 5 along the direction in which the card 1 flows (arrow F), and the other target detecting sensor or the target detecting sensor 123 is located on the downstream side of the card guiding section 5. The target detecting sensors 122 and 123 are provided on the upstream and downstream sides of the UV sensors 120 and 121, as shown in FIG. 12. The UV sensors 120 and 121 each include an LED that emits ultraviolet light (ultraviolet LED) and a sensing device. Marks M, which form the code C, are printed on each card 1 with ultraviolet emitting ink, which develops a color when irradiated with ultraviolet light. The card 1 is irradiated with ultraviolet light (black light), and light reflected off the marks M, which form the code C on the card 1, is sensed with the sensing devices. The UV sensors 120 and 121 are connected to the card sensing section 7 and the card reading section 8 and further to the control section 10 via cables. The card sensing section 7 and the card reading section 8 receive signals outputted from the sensing devices of the UV sensors 120 and 121 and determine the combination of the marks M to determine the number (rank) corresponding to the code C.

Figure 11:
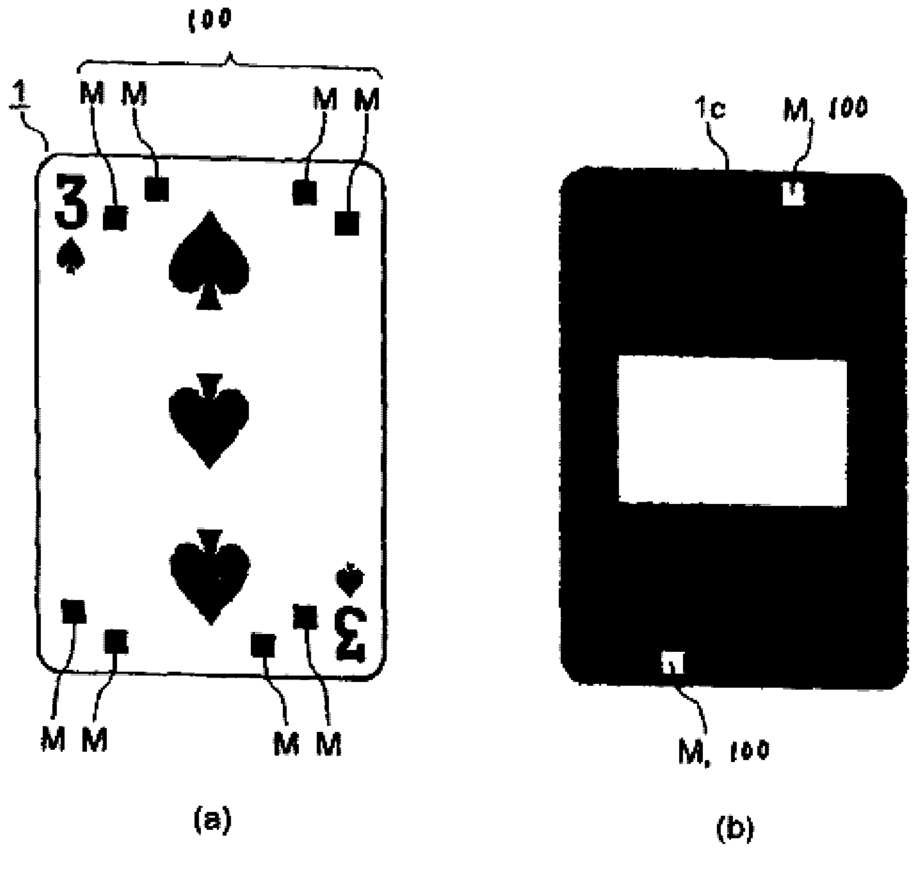
FIG. 11 is a plan view of a shuffle playing card and a cut-card in the embodiment of the present invention.

In the card sensing section 7 and the card reading section 8, the start and end of the reading operation performed by the UV sensors 120 and 121 are controlled by the control section 10 on the basis of detection signals from the target detecting sensors 122 and 123. Further, the control section 10 evaluates whether or not a card 1 has successfully passed through the card guiding section 5 on the basis of the detection signals from the target detecting sensors 122 and 123. The rectangular marks M, which represent the rank (number) and suit (such as heart and spade), are arranged along an edge of a card 1 in two rows and four columns, as shown in FIG. 11. The UV sensors 120 and 121, when they sense the marks M, output ON signals. The card sensing section 7 and the card reading section 8 evaluate the relationship between the two signals inputted from the two UV sensors 120 and 121. The card sensing section 7 and the card reading section 8 thus identify the code on the basis of the difference between the two marks M and other factors sensed by the two UV sensors 120 and 121 to identify the number (rank) and type (suit) of the corresponding card 1.

Figure 13:
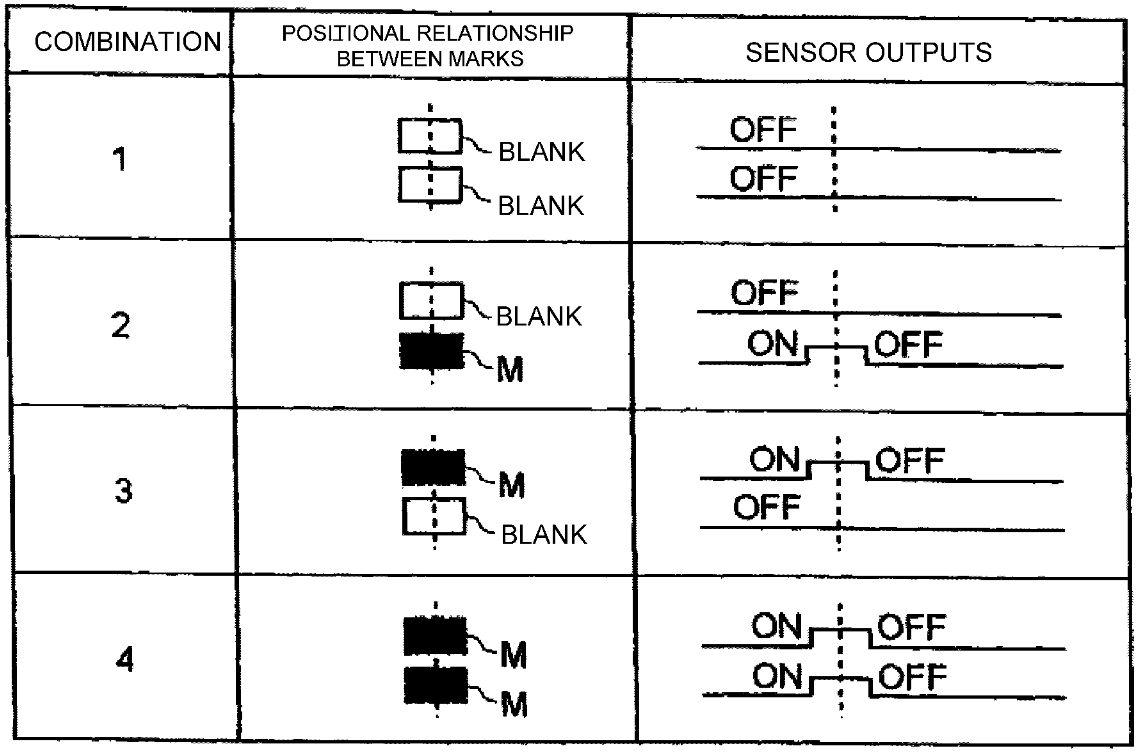
FIG. 13 is a table showing the relationship between the waveforms outputted from sensors and marks on a card in the embodiment of the present invention.

FIG. 13 shows the relationship between the code C and the ON signals outputted from the two UV sensors 120, 121. A predetermined combination of the marks M can be identified on the basis of a result of comparison between relative changes in the ON signals outputted from the UV sensors 120 and 121. As a result, four combinations of the marks M in the upper and lower two rows are obtained, and printing the four combinations in four rows allows 256 codes, the four types raised to the power of four, to be achieved. Some of the 256 codes are assigned to the 52 playing cards, and the assignment is memorized as a cross-reference table in a memory or in the form of a program. The card sensing section 7 and the card reading section 8 identify the code C of each card 1 to identify the number (rank) and the type (suit) of the card 1 on the basis of the pre-specified cross-reference table (not shown). Since the 256 codes can be memorized in the form of a cross-reference table with the codes arbitrarily related to the 52 cards, complicated combinations can be achieved, whereby the combination of the 256 codes with the 52 cards can be changed in accordance with time and place. The code of a card is desirably printed with paint visualized when irradiated with ultraviolet light in positions where the codes do not overlap with the printed suit and index of the card.

A variety of embodiments of the present invention have been described above, but the embodiments described above can, of course, be changed by a person skilled in the art within the scope of the present invention, and the apparatus of the present embodiment may be appropriately changed in accordance with necessities in a game to which the present invention is applied.

REFERENCE SIGNS LIST

1 Shuffle playing card
1*s* Set of shuffle playing card
1*c* Cut-card
2 Card accommodating section
3 Lid
3*s* Lid open/close sensor
4 Game table
5 Card guiding section
6 Opening
7 Card sensing section (card sensor)
8 Card reading section
9 Win/loss evaluating section
10 Control section
10M Memory
11 Output section
12 Result output control section
13 Side-surface monitor
14 Management control section
14M Memory
14*o* Transmitter
14*s* Mode switcher
100 Code
114 Sensor cover
120 Ultraviolet responsive sensor
121 Ultraviolet responsive sensor
122 Target sensor
123 Target sensor
201 Seat
205 Factory
206 Casino
207 Management section
207*b* Database
208 Backyard
209 Vehicle
210 Cabinet
212 Monitoring camera
260 Monitor display
300 Box-shaped apparatus
301 Barcode reader
302 Lock button
303 Lock release button
304 Key switch
305 Power switch
306 Power connector
BA Bet area
BC Barcode
C Punter (player)
CA Carton
D Dealer
F Card drawing direction
I ID code
M Mark
PA Package
R Barcode reader
S Card shoe
W Bet
Z Cutting line
A Play period
Ax Dealing period
Ay Player's period
B Period excluding the play
Bx Bet period
By Bet settlement period
EX Waiting-for-punter period
G Game period
GT Period for which shuffle playing cards on a package basis or on a set basis are used
SC In-shoe package exchange period

The invention claimed is:

1. A table game system comprising:
a card shoe including:
a card accommodating section configured to accommodate shuffle playing cards that are playing cards formed of a multiple number of decks and shuffled and packaged or set; and
an opening through which the cards are configured to be drawn one by one from the card accommodating section onto a game table,
wherein the card shoe includes:
a card sensor configured to sense that one of the cards is drawn and outputs a signal;
a card reading section configured to read at least a rank of the drawn card;
a win/loss evaluating section configured to perform win/loss evaluation of a card game based on information on the rank of the card read by the card reading section; and
a win/loss evaluation result output section configured to output a result of the win/loss evaluation performed by the win/loss evaluating section;
a management control section configured to:
measure, based on points of time when specific items in a card game occur, a period between points of time when at least two of the specific items occur; and measure, as an item of the measurement of the period between the points of time when the at least two specific items occur, a period from time when a mode is switched to a period measurement omission mode to time when the card game starts as a measurement omission period; and a mode switcher configured to switch a mode to the period measurement omission mode when a card game does not start.

2. The table game system according to claim 1, wherein the management control section is configured to measure, as an item of the measurement of the period between the points of time when the at least two specific items occur, a period from time when a first card is drawn to time when the win/loss evaluation result output stars as a play period.

3. The table game system according to claim 1, wherein the item of the measurement of the period between the points of time when the at least two specific items occur further includes at least one of:

(1) an item of measurement of a period from the time when the win/loss evaluation result output starts to the time when the win/loss evaluation result output stops a bet settlement period; or (2) an item of measurement of a period from time when the win/loss evaluation result output in a preceding game stops to the time when a first card is drawn as a bet period.

4. The table game system according to claim 3, wherein the management control section is configured to add a result of the measurement of the bet settlement period to a result of the measurement of the bet period and record a result of the addition as a period excluding play.

5. The table game system according to claim 4, wherein the management control section is configured to add a play period to a result of the measurement of the period excluding play and record a result of the addition as a game period.

6. The table game system according to claim 1, wherein, as the item of the measurement of the period between the points of time when the at least two specific items occurred, at least one of:

(1) an item of measurement of a period from the time when a first card is drawn to time when a fourth card is drawn as a dealing period; or (2) an item of measurement of a period from the time when the fourth card is drawn to the time when the win/loss evaluation result output starts as a player's period is further measured as a content of the play period.

7. The table game system according to claim 1, wherein the management control section further includes an error sensing section configured to:

store a predetermined rule of the card game; and sense, based on the predetermined rule, a state of an error that is against the predetermined rule of the card game.

8. The table game system according to claim 7, wherein the management control section is further configured to identify at least one of:

(1) drawing of a subsequent card from the card shoe in a course of the card game, and (2) the win/loss evaluation result output performed by the win/loss evaluation result output section showing that the table game system has recovered from an error state and measures an error recovery period required from time when the error sensing section senses the error to time when recovery from the error state is achieved.

9. The table game system according to claim 1, wherein the management control section is configured to:

set a standard guideline period corresponding to at least one of a measured dealing period, a player's period, a bet settlement period, a bet period, a play period, a period excluding play, or a game period; and output a fact that any measured period exceeds the standard guideline period.

10. The table game system according to claim 1, wherein the management control section is further configured to calculate, for a plurality of games, an average of at least one of a measured dealing period, a player's period, a bet settlement period, a bet period, a play period, a period excluding play, or a game period.

11. The table game system according to claim 1, wherein the management control section is configured to calculate a ratio based on at least one of a measured dealing period, a player's period, a bet settlement period, a bet period, a play period, a period excluding play, or a game period.

12. The table game system according to claim 1, wherein the management control section is further configured to exclude a measured measurement omission period from at least one of a bet period, a period excluding play, or a game period in a game immediately after a switch of the mode to the period measurement omission mode.

13. A table game system comprising:

a card shoe including:

a card accommodating section configured to accommodate shuffle playing cards that are playing cards formed of a multiple number of decks and shuffled and packaged or set; and an opening through which the cards are configured to be drawn one by one from the card accommodating section onto a game table;

a management control section configured to:

measure, based on points of time when specific items in a card game occur, a period between points of time when at least two of the specific items occur; and measure, as an item of the measurement of the period between the points of time when the at least two specific items occur, a period from time when a mode is switched to a period measurement omission mode to time when the card game starts; and a mode switcher configured to switch a mode to the period measurement omission mode when the card game does not start.

* * * * *